US009626965B2

(12) United States Patent
Printz et al.

(10) Patent No.: US 9,626,965 B2
(45) Date of Patent: Apr. 18, 2017

(54) EFFICIENT EMPIRICAL COMPUTATION AND UTILIZATION OF ACOUSTIC CONFUSABILITY

(71) Applicant: PROMPTU SYSTEMS CORPORATION, Menlo Park, CA (US)

(72) Inventors: Harry Printz, San Francisco, CA (US); Naren Chittar, Mountain View, CA (US)

(73) Assignee: PROMPTU SYSTEMS CORPORATION, Menlo Park, CA (US)

( * ) Notice: Subject to any disclaimer, the term of this patent is extended or adjusted under 35 U.S.C. 154(b) by 181 days.

(21) Appl. No.: 14/574,314

(22) Filed: Dec. 17, 2014

(65) Prior Publication Data

US 2015/0106100 A1    Apr. 16, 2015

Related U.S. Application Data

(62) Division of application No. 11/932,122, filed on Oct. 31, 2007, now Pat. No. 8,959,019.

(51) Int. Cl.
*G10L 15/12* (2006.01)
*G10L 15/187* (2013.01)
(Continued)

(52) U.S. Cl.
CPC ........ *G10L 15/22* (2013.01); *G06F 17/30867* (2013.01); *G06Q 30/02* (2013.01);
(Continued)

(58) Field of Classification Search
CPC ....... G10L 15/02; G10L 15/063; G10L 15/12; G10L 15/187
(Continued)

(56) References Cited

U.S. PATENT DOCUMENTS 4,980,918 A  * 12/1990 Bahl ...................... G10L 15/08
                                                          704/240
5,553,119 A    9/1996 McAllister et al.
(Continued)

FOREIGN PATENT DOCUMENTS

EP      1341363       9/2003
EP      1003018       5/2005
(Continued)

OTHER PUBLICATIONS

"Dijkstra's Algorithm", Wikipedia, 16 Pages, Downloaded Jul. 18, 2016.*

(Continued)

*Primary Examiner* — Martin Lerner
(74) *Attorney, Agent, or Firm* — Perkins Coie LLP

(57) ABSTRACT

Efficient empirical determination, computation, and use of an acoustic confusability measure comprises: (1) an empirically derived acoustic confusability measure, comprising a means for determining the acoustic confusability between any two textual phrases in a given language, where the measure of acoustic confusability is empirically derived from examples of the application of a specific speech recognition technology, where the procedure does not require access to the internal computational models of the speech recognition technology, and does not depend upon any particular internal structure or modeling technique, and where the procedure is based upon iterative improvement from an initial estimate; (2) techniques for efficient computation of empirically derived acoustic confusability measure, comprising means for efficient application of an acoustic confusability score, allowing practical application to very large-scale problems; and (3) a method for using acoustic confusability measures to make principled choices about (Continued)

which specific phrases to make recognizable by a speech recognition application.

7 Claims, 8 Drawing Sheets

(51) Int. Cl.
*G10L 15/22* (2006.01)
*G06Q 30/02* (2012.01)
*G10L 17/26* (2013.01)
*G10L 15/18* (2013.01)
*G06F 17/30* (2006.01)

(52) U.S. Cl.
CPC .............. *G10L 15/18* (2013.01); *G10L 17/26* (2013.01); *G06F 17/30861* (2013.01)

(58) Field of Classification Search
USPC ........................................ 704/236, 240, 243
See application file for complete search history.

(56) References Cited

U.S. PATENT DOCUMENTS

| | | |
|---|---|---|
| 5,581,655 A | 12/1996 | Cohen et al. |
| 5,611,019 A | 3/1997 | Nakatoh et al. |
| 5,698,834 A | 12/1997 | Worthington et al. |
| 5,737,723 A | 4/1998 | Riley et al. |
| 5,752,232 A | 5/1998 | Basore et al. |
| 5,774,859 A | 6/1998 | Houser et al. |
| 5,963,903 A | 10/1999 | Hon et al. |
| 6,009,387 A | 12/1999 | Ramaswamy et al. |
| 6,012,058 A | 1/2000 | Fayyad et al. |
| 6,021,387 A | 2/2000 | Mozer et al. |
| 6,049,767 A | 4/2000 | Printz |
| 6,073,099 A | 6/2000 | Sabourin et al. |
| 6,130,726 A | 10/2000 | Darbee et al. |
| 6,141,640 A | 10/2000 | Moo |
| 6,182,039 B1 | 1/2001 | Rigazio et al. |
| 6,243,679 B1 * | 6/2001 | Mohri ................... G10L 15/193 704/10 |
| 6,260,013 B1 | 7/2001 | Sejnoha |
| 6,263,308 B1 | 7/2001 | Heckerman et al. |
| 6,298,324 B1 | 10/2001 | Zuberec et al. |
| 6,301,560 B1 | 10/2001 | Masters |
| 6,320,947 B1 | 11/2001 | Joyce et al. |
| 6,336,091 B1 | 1/2002 | Polikaitis et al. |
| 6,374,177 B1 | 4/2002 | Lee et al. |
| 6,374,226 B1 | 4/2002 | Hunt et al. |
| 6,381,316 B2 | 4/2002 | Joyce et al. |
| 6,408,272 B1 | 6/2002 | White et al. |
| 6,415,257 B1 | 7/2002 | Junqua et al. |
| 6,424,935 B1 | 7/2002 | Taylor |
| 6,446,035 B1 | 9/2002 | Grefenstette et al. |
| 6,658,414 B2 | 12/2003 | Bryan et al. |
| 6,665,644 B1 | 12/2003 | Kanevsky et al. |
| 6,711,541 B1 | 3/2004 | Kuhn et al. |
| 6,711,543 B2 | 3/2004 | Cameron |
| 6,714,632 B2 | 3/2004 | Joyce et al. |
| 6,721,633 B2 | 4/2004 | Funk et al. |
| 6,725,022 B1 | 4/2004 | Clayton et al. |
| 6,728,531 B1 | 4/2004 | Lee et al. |
| 6,754,625 B2 | 6/2004 | Olsen et al. |
| 6,799,201 B1 | 9/2004 | Lee et al. |
| 6,804,653 B2 | 10/2004 | Gabel |
| 6,892,083 B2 | 5/2005 | Shostak |
| 6,901,366 B1 | 5/2005 | Kuhn et al. |
| 6,975,993 B1 | 12/2005 | Keiller |
| 6,985,865 B1 | 1/2006 | Packingham et al. |
| 7,013,276 B2 | 3/2006 | Bickley et al. |
| 7,020,609 B2 | 3/2006 | Thrift et al. |
| 7,027,987 B1 | 4/2006 | Franz et al. |
| 7,062,477 B2 | 6/2006 | Fujiwara et al. |
| 7,113,981 B2 | 9/2006 | Slate |
| 7,117,159 B1 | 10/2006 | Packingham et al. |
| 7,158,959 B1 | 1/2007 | Chickering et al. |
| 7,188,066 B2 | 3/2007 | Falcon et al. |
| 7,203,645 B2 | 4/2007 | Pokhariyal et al. |
| 7,219,056 B2 | 5/2007 | Axelrod et al. |
| 7,231,380 B1 | 6/2007 | Pienkos |
| 7,263,489 B2 | 8/2007 | Cohen et al. |
| 7,324,947 B2 | 1/2008 | Jordan et al. |
| 7,428,555 B2 | 9/2008 | Yan |
| 7,447,636 B1 | 11/2008 | Schwartz et al. |
| 7,483,885 B2 | 1/2009 | Chandrasekar et al. |
| 7,519,534 B2 | 4/2009 | Maddux et al. |
| 7,590,605 B2 | 9/2009 | Josifovski |
| 7,654,455 B1 | 2/2010 | Bhatti et al. |
| 7,769,786 B2 | 8/2010 | Patel |
| 7,809,601 B2 | 10/2010 | Shaya et al. |
| 7,844,456 B2 | 11/2010 | Cai et al. |
| 7,904,296 B2 | 3/2011 | Morris |
| 7,934,658 B1 | 5/2011 | Bhatti et al. |
| 7,949,526 B2 | 5/2011 | Ju et al. |
| 8,165,916 B2 | 4/2012 | Hoffberg et al. |
| 8,306,818 B2 | 11/2012 | Chelba et al. |
| 8,321,278 B2 | 11/2012 | Haveliwala et al. |
| 8,321,427 B2 | 11/2012 | Stampleman et al. |
| 8,374,870 B2 | 2/2013 | Braho et al. |
| 8,515,753 B2 | 8/2013 | Kim et al. |
| 8,793,127 B2 | 7/2014 | Printz et al. |
| 8,959,019 B2 * | 2/2015 | Printz .................... G10L 15/18 704/236 |
| 2001/0019604 A1 | 9/2001 | Joyce et al. |
| 2002/0015480 A1 | 2/2002 | Daswani et al. |
| 2002/0032549 A1 | 3/2002 | Axelrod et al. |
| 2002/0032564 A1 | 3/2002 | Ehsani et al. |
| 2002/0046030 A1 | 4/2002 | Haritsa et al. |
| 2002/0049535 A1 | 4/2002 | Rigo et al. |
| 2002/0106065 A1 | 8/2002 | Joyce et al. |
| 2002/0116191 A1 * | 8/2002 | Olsen .................... G10L 15/06 704/251 |
| 2002/0146015 A1 | 10/2002 | Bryan et al. |
| 2003/0004728 A1 | 1/2003 | Keiller |
| 2003/0028380 A1 | 2/2003 | Freeland et al. |
| 2003/0033152 A1 | 2/2003 | Cameron |
| 2003/0061039 A1 | 3/2003 | Levin |
| 2003/0065427 A1 | 4/2003 | Funk et al. |
| 2003/0068154 A1 | 4/2003 | Zylka et al. |
| 2003/0069729 A1 | 4/2003 | Bickley et al. |
| 2003/0073434 A1 | 4/2003 | Shostak |
| 2003/0093281 A1 | 5/2003 | Geilhufe et al. |
| 2003/0125928 A1 | 7/2003 | Lee et al. |
| 2003/0177013 A1 | 9/2003 | Falcon et al. |
| 2003/0212702 A1 | 11/2003 | Campos et al. |
| 2004/0077334 A1 | 4/2004 | Joyce et al. |
| 2004/0110472 A1 | 6/2004 | Witkowski et al. |
| 2004/0127241 A1 | 7/2004 | Shostak |
| 2004/0132433 A1 | 7/2004 | Stern et al. |
| 2004/0193408 A1 | 9/2004 | Hunt |
| 2004/0199498 A1 | 10/2004 | Kapur et al. |
| 2005/0010412 A1 | 1/2005 | Aronowitz |
| 2005/0071224 A1 | 3/2005 | Fikes et al. |
| 2005/0125224 A1 | 6/2005 | Myers et al. |
| 2005/0143139 A1 | 6/2005 | Park et al. |
| 2005/0144251 A1 | 6/2005 | Slate |
| 2005/0170863 A1 | 8/2005 | Shostak |
| 2005/0228670 A1 | 10/2005 | Mahajan et al. |
| 2006/0018440 A1 | 1/2006 | Watkins et al. |
| 2006/0028337 A1 | 2/2006 | Li |
| 2006/0050686 A1 | 3/2006 | Velez-Rivera et al. |
| 2006/0064177 A1 | 3/2006 | Tian et al. |
| 2006/0085521 A1 | 4/2006 | Sztybel |
| 2006/0136292 A1 | 6/2006 | Bhati et al. |
| 2006/0149635 A1 | 7/2006 | Bhatti et al. |
| 2006/0206339 A1 | 9/2006 | Silvera et al. |
| 2006/0206340 A1 | 9/2006 | Silvera et al. |
| 2006/0259467 A1 | 11/2006 | Westphal |
| 2006/0271546 A1 | 11/2006 | Phung |
| 2007/0027864 A1 | 2/2007 | Collins et al. |
| 2007/0033003 A1 | 2/2007 | Morris |
| 2007/0067285 A1 | 3/2007 | Blume et al. |
| 2007/0179784 A1 | 8/2007 | Thambiratnam et al. |

(56) References Cited

U.S. PATENT DOCUMENTS

| | | | |
|---|---|---|---|
| 2008/0021860 A1 | 1/2008 | Wiegering et al. | |
| 2008/0082322 A1* | 4/2008 | Joublin | G10L 25/48 704/209 |
| 2008/0103887 A1 | 5/2008 | Oldham et al. | |
| 2008/0103907 A1 | 5/2008 | Maislos et al. | |
| 2008/0250448 A1 | 10/2008 | Rowe et al. | |
| 2009/0048910 A1 | 2/2009 | Shenfield et al. | |

FOREIGN PATENT DOCUMENTS

| | | |
|---|---|---|
| EP | 1633150 | 3/2006 |
| EP | 1633151 | 3/2006 |
| EP | 1742437 | 1/2007 |
| WO | WO-00/16568 | 3/2000 |
| WO | WO-00/21232 | 4/2000 |
| WO | WO-01/22112 | 3/2001 |
| WO | WO-01/22249 | 3/2001 |
| WO | WO-01/22633 | 3/2001 |
| WO | WO-01/22712 | 3/2001 |
| WO | WO-01/22713 | 3/2001 |
| WO | WO-01/39178 | 5/2001 |
| WO | WO-01/57851 | 8/2001 |
| WO | WO-02/07050 | 1/2002 |
| WO | WO-02/11120 | 2/2002 |
| WO | WO-02/17090 | 2/2002 |
| WO | WO-02/097590 | 12/2002 |
| WO | WO-2004/077721 | 9/2004 |
| WO | WO-2006/033841 | 3/2006 |
| WO | WO-2006/098789 | 9/2006 |
| WO | WO-2004/021149 | 3/2007 |
| WO | WO-2005/079254 | 5/2007 |
| WO | WO-2006/029269 | 5/2007 |

OTHER PUBLICATIONS

Amir, A. et al., "Advances in Phonetic Word Spotting", IBM Research Report RJ 10215, Aug. 2001, pp. 1-3.
Belzer, et al., "Symmetric Trellis-Coded Vector Quantization", IEEE Transactions on Communications, IEEE Service Center, Piscataway, NJ, vol. 45, No. 45, par. II, figure 2, Nov. 1997, pp. 1354-1357.
Chan, et al., "Efficient Codebook Search Procedure for Vector-Sum Excited Linear Predictive Coding of Speech", IEEE Electronics Letters; vol. 30, No. 22; Stevanage, GB, ISSN 0013-5194, Oct. 27, 1994, pp. 1830-1831.
Chan, "Fast Stochastic Codebook Search Through the Use of Odd-Symmetric Crosscorrelation Basis Vectors", Int'l Conference on Acoustics, Speech and Signal Processing; Detroit, Michigan, vol. 1, Par. 1; ISBN 0-7803-2461-5, May 1995, pp. 21-24.
Chen, et al., "Diagonal Axes method (DAM): A Fast Search Algorithm for Vecotr Quantization", IEEE Transactions on Circuits and Systems for Video Technology, Piscataway, NJ; vol. 7, No. 3, ISSN 1051-8215; Par. I, II, Jun. 1997, pp. 555-559.
Hanzo, et al., "Voice Compression and Communications—Principles and Applications for Fixed and Wireless Channels", Wiley, ISBN 0-471-15039-8; par. 4.3.3, 2001, pp. 107-111.
Salami, et al., "A Fully Vector Quantised Self-Excited Vocoder", Int'l Conference on Acoustics, Speech & Signal Processing; vol. 1, par. 3.1; Glasgow, May 1989, pp. 124-127.
Schotz, S. , "Automatic prediction of speaker age using CART", Course paper for course in Speech Recognition, Lund University, retrieved online from url: http://person2.sol.lu.se/SusznneSchotz/downloads/SR_paper_SusanneS2004.pdf, 2003, 8 pages.

* cited by examiner

```
(jh ae g w aa r z) <Jaguars#Jaguares>
(jh ow jh ow) <JoJo#Jo Jo>
(k ae m r ax n) <Cam'Ron#Cam'ron>
(k eh r ax l k ih ng)<Carol
King#Carole King>
(k eh r ax l k ix ng)<Carol
King#Carole King>
```

FIG. 8

```
True literal(Bangles(artists.xml)) -
clarity(27.75 dC)
    Bengals(artists.xml)
    Dangel(artists.xml)
    Eagles(artists.xml)
    ATL(artistis.xml
    Bills(artists.xml)

True literal(Gold(artists.xml)) -
clarity(33.35 dC)
    Cold(artists.xml)
    Go's(artists.xml)
    Colts(artists.xml)
    Moe(artists.xml)
    Eagles(artists.xml)
    Joe(artists.xml)
```

EFFICIENT EMPIRICAL COMPUTATION AND UTILIZATION OF ACOUSTIC CONFUSABILITY

CROSS REFERENCE TO RELATED APPLICATIONS

This application is a divisional application of U.S. patent application Ser. No. 11/932,122, filed Oct. 31, 2007, which is incorporated herein in its entirety by this reference thereto.

BACKGROUND OF THE INVENTION

Technical Field

The invention relates to speech recognition. More particularly, the invention relates to efficient empirical determination, computation, and use of an acoustic confusability measure.

Description of the Prior Art

In United States Patent Application Publication No. 20020032549, it is stated:

In the operation of a speech recognition system, some acoustic information is acquired, and the system determines a word or word sequence that corresponds to the acoustic information. The acoustic information is generally some representation of a speech signal, such as the variations in voltage generated by a microphone. The output of the system is the best guess that the system has of the text corresponding to the given utterance, according to its principles of operation.

The principles applied to determine the best guess are those of probability theory. Specifically, the system produces as output the most likely word or word sequence corresponding to the given acoustic signal. Here, "most likely" is determined relative to two probability models embedded in the system: an acoustic model and a language model. Thus, if A represents the acoustic information acquired by the system, and W represents a guess at the word sequence corresponding to this acoustic information, then the system's best guess W* at the true word sequence is given by the solution of the following equation:

$$W^* = \mathrm{argmax}_W P(A|W)P(W).$$

Here P(A|W) is a number determined by the acoustic model for the system, and P(W) is a number determined by the language model for the system. A general discussion of the nature of acoustic models and language models can be found in "Statistical Methods for Speech Recognition," Jelinek, The MIT Press, Cambridge, Mass. 1999, the disclosure of which is incorporated herein by reference. This general approach to speech recognition is discussed in the paper by Bahl et al., "A Maximum Likelihood Approach to Continuous Speech Recognition," IEEE Transactions on Pattern Analysis and Machine Intelligence, Volume PAMI-5, pp. 179-190, March 1983, the disclosure of which is incorporated herein by reference.

The acoustic and language models play a central role in the operation of a speech recognition system: the higher the quality of each model, the more accurate the recognition system. A frequently-used measure of quality of a language model is a statistic known as the perplexity, as discussed in section 8.3 of Jelinek. For clarity, this statistic will hereafter be referred to as "lexical perplexity." It is a general operating assumption within the field that the lower the value of the lexical perplexity, on a given fixed test corpus of words, the better the quality of the language model.

However, experience shows that lexical perplexity can decrease while errors in decoding words increase. For instance, see Clarkson et al., "The Applicability of Adaptive Language Modeling for the Broadcast News Task," Proceedings of the Fifth International Conference on Spoken Language Processing, Sydney, Australia, November 1998, the disclosure of which is incorporated herein by reference. Thus, lexical perplexity is actually a poor indicator of language model effectiveness.

Nevertheless, lexical perplexity continues to be used as the objective function for the training of language models, when such models are determined by varying the values of sets of adjustable parameters. What is needed is a better statistic for measuring the quality of language models, and hence for use as the objective function during training.

United States Patent Application Publication No. 20020032549 teaches an invention that attempts to solve these problems by:

Providing two statistics that are better than lexical perplexity for determining the quality of language models. These statistics, called acoustic perplexity and the synthetic acoustic word error rate (SAWER), in turn depend upon methods for computing the acoustic confusability of words. Some methods and apparatuses disclosed herein substitute models of acoustic data in place of real acoustic data in order to determine confusability.

In a first aspect of the invention taught in United States Patent Application Publication No. 20020032549, two word pronunciations l(w) and l(x) are chosen from all pronunciations of all words in fixed vocabulary V of the speech recognition system. It is the confusability of these pronunciations that is desired. To do so, an evaluation model (also called valuation model) of l(x) is created, a synthesizer model of l(x) is created, and a matrix is determined from the evaluation and synthesizer models. Each of the evaluation and synthesizer models is preferably a hidden Markov model. The synthesizer model preferably replaces real acoustic data. Once the matrix is determined, a confusability calculation may be performed. This confusability calculation is preferably performed by reducing an infinite series of multiplications and additions to a finite matrix inversion calculation. In this manner, an exact confusability calculation may be determined for the evaluation and synthesizer models.

In additional aspects of the invention taught in United States Patent Application Publication No. 20020032549, different methods are used to determine certain numerical quantities, defined below, called synthetic likelihoods. In other aspects of the invention, (i) the confusability may be normalized and smoothed to better deal with very small probabilities and the sharpness of the distribution, and (ii) methods are disclosed that increase the speed of performing the matrix inversion and the confusability calculation. Moreover, a method for caching and reusing computations for similar words is disclosed.

Such teachings are yet limited and subject to improvement.

SUMMARY OF THE INVENTION

There are three related elements to the invention herein: Empirically Derived Acoustic Confusability Measures The first element comprises a means for determining the acoustic confusability of any two textual phrases in a given language. Some specific advantages of the means presented here are:

Empirically Derived. The measure of acoustic confusability is empirically derived from examples of the application of a specific speech recognition technology. Thus, the confusability scores assigned by the measure may be expected to reflect the actual performance of a deployed instance of the technology, in a particular application.

Depends Only on Recognizer Output. The procedure described herein does not require access to the internal computational models of the underlying speech recognition technology, and does not depend upon any particular internal structure or modeling technique, such as Hidden Markov Models (HMMs). Only the output of the speech recognition system, comprising the sequence of decoded phonemes, is needed.

Iteratively Trained. The procedure described is based upon iterative improvement from an initial estimate, and therefore may be expected to be superior to any a priori human assignment of phoneme confusion scores, or to a method that makes only a single, initial estimate of phoneme confusion scores, without iterative improvement.

Techniques for Efficient Computation of Empirically Derived Acoustic Confusability Measures The second element comprises computational techniques for efficiently applying the acoustic confusability scoring mechanism. Previous inventions have alluded to the use of acoustic confusability measures, but notably do not discuss practical aspects of applying them. In any real-world practical scheme, it is often required to estimate the mutual acoustic confusability of tens of thousands of distinct phrases. Without efficient means of computing the measure, such computations rapidly become impractical. In this patent, we teach means for efficient application of our acoustic confusability measure, allowing practical application to very large-scale problems.

Method for Using Acoustic Confusability Measures

The third element comprises a method for using acoustic confusability measures, derived by whatever means (thus, not limited to the measure disclosed here), to make principled choices about which specific phrases to make recognizable by a speech recognition application.

BRIEF DESCRIPTION OF THE DRAWINGS

FIG. 8 shows a confusatron output for typical homonyms according to the invention, comprising a small portion of the list of homonyms, generated from a grammar that comprised popular musical artist names, where the parenthesized text is the pronunciation that is shared by the two colliding phrases and, where in each case, the list of colliding phrases appears to the right, enclosed in angle brackets, with list elements separated by a # sign; and FIG. 9: shows a confusatron output for typical dangerous words according to the invention, comprising a small portion of the list of dangerous words, where each entry is comprised of the nominal truth, and its clarity score, followed by a list (in order of decreasing confusability) of the other literals in the grammar that are likely to be confused with it and, where the items listed below the true literal are likely erroneous decodings, when the given true utterance has been spoken.

DETAILED DESCRIPTION OF THE INVENTION

Figure 1:
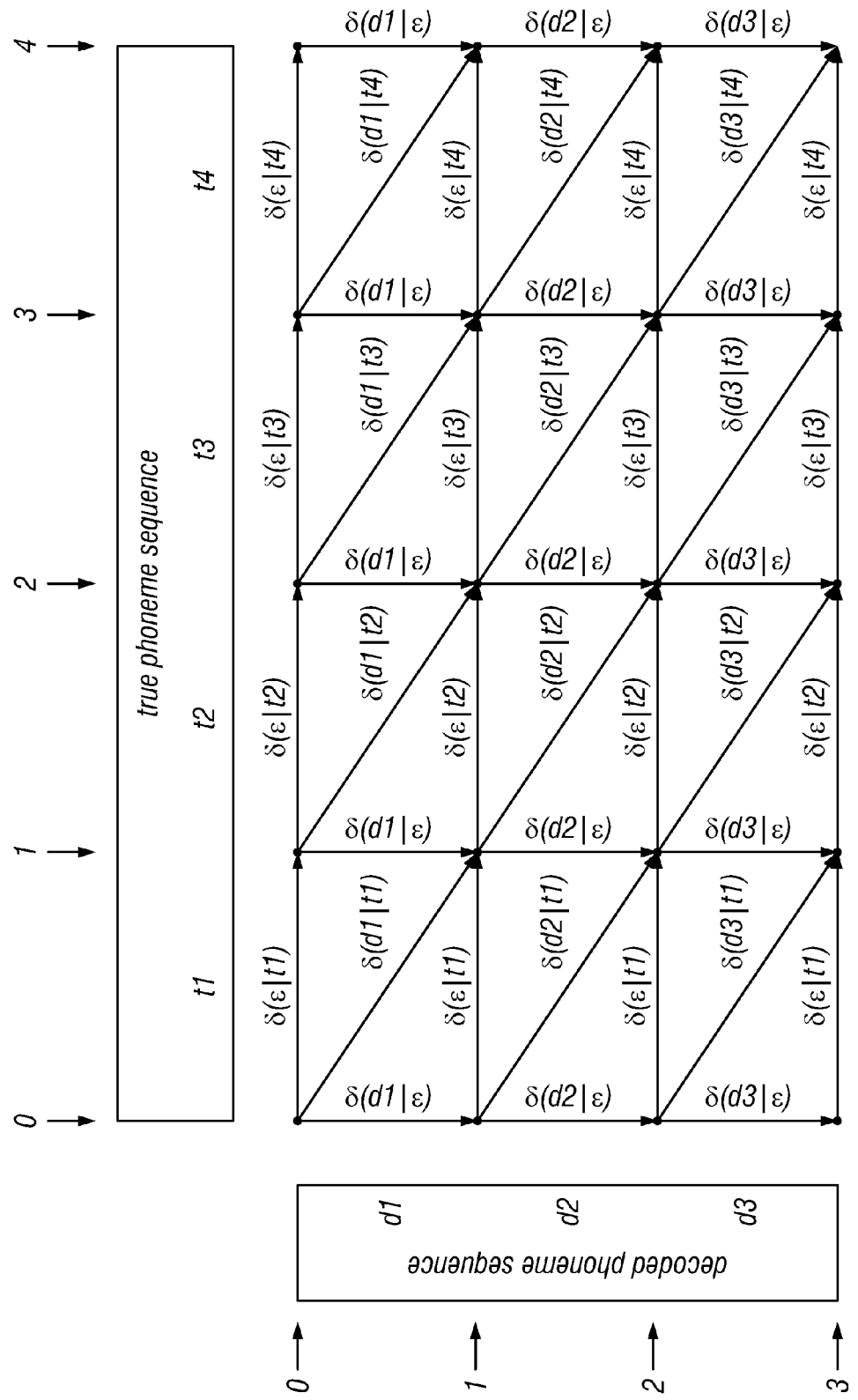
FIG. 1 shows a basic lattice according to the invention, where the numbers along the left are the row coordinates, the numbers along the top are column coordinates, and the small dots are the nodes of the lattice. The coordinates are used to identify the nodes of the lattice, in the form (row coordinate, column coordinate). Thus, the coordinates of the node in the upper-right corner are (0, 4)

There are three related elements to the presently preferred embodiment of invention disclosed herein:

Empirically Derived Acoustic Confusability Measures

The first element comprises a means for determining the acoustic confusability of any two textual phrases in a given language. Some specific advantages of the means presented here are:

Empirically Derived. The measure of acoustic confusability is empirically derived from examples of the application of a specific speech recognition technology. Thus, the confusability scores assigned by the measure may be expected to reflect the actual performance of a deployed instance of the technology, in a particular application.

Depends Only on Recognizer Output. The procedure described herein does not require access to the internal computational models of the underlying speech recognition technology, and does not depend upon any particular internal structure or modeling technique, such as Hidden Markov Models (HMMs). Only the output of the speech recognition system, comprising the sequence of decoded phonemes, is needed.

Iteratively Trained. The procedure described is based upon iterative improvement from an initial estimate, and therefore may be expected to be superior to any a priori human assignment of phoneme confusion scores, or to a method that makes only a single, initial estimate of phoneme confusion scores, without iterative improvement.

Techniques for Efficient Computation of Empirically Derived Acoustic Confusability Measures The second element comprises computational techniques for efficiently applying the acoustic confusability scoring mechanism. Previous inventions have alluded to the use of acoustic confusability measures, but notably do not discuss practical aspects of applying such mechanisms. In any real-world practical scheme, it is often required to estimate the mutual acoustic confusability of tens of thousands of distinct phrases. Without efficient means of computing the measure, such computations rapidly become impractical. In this patent, we teach means for efficient application of our acoustic confusability score, allowing practical application to very large-scale problems.

Method for Using Acoustic Confusability Measures

The third element comprises a method for using acoustic confusability measures, derived by whatever means (thus, not limited to the measure disclosed here), to make principled choices about which specific phrases to make recognizable by a speech recognition application.

Empirically Derived Acoustic Confusability Measure

The immediately following discussion explains how to derive and compute an empirically derived acoustic confusability measure. The discussion is divided into several subsections;

In Section 1, we establish some notation and nomenclature, common to the invention as a whole.

In Section 2, we explain how to empirically derive our acoustic confusability measure.

In Section 3, we explain how to use the output of the preceding section to compute the acoustic confusability of any two phrases.

1. Notation and Nomenclature

We first establish some notation and nomenclature. The symbol or expression being defined appears in the left hand column; the associated text explains its meaning or interpretation. Italicized English words, in the associated text, give the nomenclature we use to refer to the symbol and the concept.

u a single complete *utterance*, represented as an audio recording w a *word sequence*, *phrase*, or *literal*, represented as text. We will use these terms interchangeably.

X the *corpus*; thus a sequence of utterances $u_1, u_2, \ldots u_C$ and associated transcriptions $T_1, T_2, \ldots, T_C$, where C is the number of utterances in the corpus. To underscore that the corpus contains audio data, we will sometimes refer to it as the *audio corpus* or *acoustic corpus*.

P the *recognized corpus*; the result of passing the audio corpus through a given speech recognition system.

Φ the *phoneme alphabet* of the human language in question. This is a finite collection of the basic sound units of the language, denoted by some textual names or symbols. For the purposes of this discussion, we will use the Speech Assessment Methods Phonetic Alphabet (SAMPA) for US English, as defined in Language Supplement, OpenSpeech™ Recognizer, (US English), for English in the United States (en-US), Second Edition, May 2004, page 33. Additional discussion may be found in Wikipedia.

q(w) a *pronunciation* or *baseform* (there may be several) of the phrase w, represented as a sequence of phonemes $\phi_1$, $\phi_2, \ldots, \phi_Q$, where Q is the number of phonemes in the pronunciation. Each $\phi_i$ is a member of Φ.

Q(w) the set of all pronunciations of w

G a *grammar*, in the sense of an automatic speech recognition system; thus comprising a representation of all phrases (also referred to as word sequences or literals) that the system may recognize, nominally with some symbolic meaning attached to each phrase L(G) the *language* of G; thus a list of all word sequences admissible by G Q(L(G)) the set of all pronunciations of all word sequences appearing in L(G); thus a list of one or more phoneme sequences for each word sequence in L(G)

R a *recognizer* or *automatic speech recognition system*; thus a computer system that accepts utterances as input and returns decodings. We will use the terms "recognizer," "automatic speech recognition system," "speech recognition system" and "recognition system" interchangeably; they mean the same thing.

$R_G$ a recognizer that is constrained to return only decodings that correspond to phrases in the grammar G D a *decoding*; the output of a speech recognition system when presented with an utterance. To exhibit the particular input utterance associated to the decoding, we write D(u). For our purposes, a decoding consists of a pair f, s, where f is the decoded frame sequence (defined below), and s is the associated confidence score. (Note: we may sometimes use D to denote the length of a phoneme sequence, this will be clear from context.)

s a *confidence score*; a number, determined by the recognition system, that expresses the likelihood that the decoding returned by the recognizer is correct. By assumption s lies in the interval [0, 1]; if not this can be arranged via a suitable scaling operation. Written s(u) to exhibit the associated utterance u.

T a *transcription* or *true transcription*; regular text in the human language in question. To exhibit the particular utterance associated to the transcription, we write T(u). (Note: we may sometimes use T to denote the length of a phoneme sequence, this will be clear from context.)

f a *frame* of decoded speech; thus the recognizer's output for a short segment of speech, nominally a phoneme in Φ. Written f(u) to exhibit the associated utterance u.

$f=f_1 f_2 \ldots f_F$ a *decoded frame sequence*; the sequence of frames associated to a particular decoding, where F is the number of frames in the sequence. Written f(u) or $f_1(u) f_2(u) \ldots f_F(u)$ to exhibit the associated utterance u.

$d=d_1 d_2 \ldots d_N$ a *decoded phoneme sequence*; the sequence of phonemes, where N is the number of phonemes in the sequence, derived from a particular decoded frame sequence, by the operations of phoneme mapping and coalescing, explained below. Written $d_1(u) d_2(u) \ldots d_N(u)$ to exhibit the associated utterance u.

$t=t_1 t_2 \ldots t_Q$ a *true phoneme sequence*; the sequence of phonemes, where Q is the number of phonemes in the sequence, derived from a true transcription T, by a means that is explained below. Also known as a *pronunciation* of T. Written t(u) or $t_1(u) t_2(u) \ldots t_Q(u)$ to exhibit the associated utterance u. Compare with the decoded phoneme sequence, as defined above, and note that for one and the same utterance u, the decoded phoneme sequence and true phoneme sequence may and typically will differ, and may even contain different numbers of phonemes.

c(d|t) the integer-valued *count* of the phoneme pair d|t, derived as explained below.

$\delta(d|t)$ the decoding cost of decoding phoneme t as phoneme d. If neither d nor t is the empty phoneme (defined below), this is also referred to as the substitution cost of substituting d for t.

$\delta_{(i)}(d|t)$ the decoding cost of decoding phoneme t as phoneme d, at iteration i of the method. The index i is a so-called "dummy index"; the same quantity may also be denoted using the dummy index m as $\delta_{(m)}(d|t)$ to refer to the decoding cost at iteration m of the method.

$\epsilon$ the empty phoneme, sometimes called epsilon $\Phi+\epsilon$ the augmented phoneme alphabet; the set $\Phi$ augmented with the empty phoneme. Thus, $\Phi \cup \{\epsilon\}$. Sometimes written $\Phi'$.

$\delta(d|\epsilon)$ the insertion cost of inserting phoneme d into a decoding.

$\delta(\epsilon|t)$ the deletion cost of deleting phoneme t from a decoding.

$p(d|t)$ the probability of decoding a true phoneme t as the phoneme d.

$p_{(i)}(d|t)$ the probability of decoding a true phoneme t as the phoneme d, at iteration i of the method. The index i is a so-called "dummy index"; the same quantity may also be denoted using the dummy index m.

$\Pi = \{p(d|t)\}$ a family of conditional probability models, where each $p(\cdot|t)$ comprises a probability model, for each t in $\Phi+\epsilon$, over the space $\Omega = \Phi+\epsilon$.

$\Pi_{(i)} = \{p_{(i)}(d|t)\}$ a family of conditional probability models, at iteration i of the method. The index i is a so-called "dummy index"; the same quantity may also be denoted using the dummy index m.

L a lattice; formally a directed acyclic graph comprising a set of nodes N and a set of arcs or edges $E \subset N \times N$.

a an arc of L; formally an ordered pair of nodes $\langle t, h \rangle \in E$. If $a = \langle t, h \rangle$, we say that a is an arc from t to h, and refer to t as the tail, and h as the head, of arc a.

$A = a_1, a_2, \ldots a_K$ a path (of length K) in L; formally a sequence of arcs $a_1, a_2, \ldots a_K$ of L, with the property that the head of arc $a_i$ is the tail of arc $a_{i+1}$, for each $i = 1, \ldots, K-1$.

$l(a)$ the label of arc a; comprising the phoneme pair x|y, with x, $y \in \Phi'$ that is associated with the given arc in L

2. Method for Constructing an Empirically Derived Acoustic Confusability Measure We first present an outline of the method, then present a detailed explanation of how to apply the method.

Outline of Method

The method comprises two basic steps. The first step is corpus processing, in which the original corpus is passed through the automatic speech recognition system of interest. This step is non-iterative; that is, the corpus is processed just once by the recognition system. The second step is development of a family of phoneme confusability models. This step is iterative; that is, it involves repeated passes over the corpus, at each step delivering an improved family of confusability models.

Corpus Processing

We assume that we have at our disposal some large and representative set of utterances, in some given human language, with associated reliable transcriptions. We refer to this as the corpus. By an utterance we mean a sound recording, represented in some suitable computer-readable form. By transcription we mean a conventional textual representation of the utterance; by reliable we mean that the transcription may be regarded as accurate. We refer to these transcriptions as the truth, or the true transcriptions.

In this step, we pass the utterances through an automatic speech recognition system, one utterance at a time. For each utterance, the recognition system generates a decoding, in a form called a decoded frame sequence, and a confidence score. As defined above, a frame is a brief audio segment of the input utterance.

The decoded frame sequence comprises the recognizer's best guess, for each frame of the utterance, of the phoneme being enunciated, in that audio frame. As defined above, a phoneme is one of a finite number of basic sound units of a human language.

This decoded frame sequence is then transformed, by a process that we describe below, into a much shorter decoded phoneme sequence. The confidence score is a measure, determined by the recognition system, of the likelihood that the given decoding is correct.

We then inspect the true transcription of the input utterance, and by a process that we describe below, transform the true transcription (which is just regular text, in the language of interest) into a true phoneme sequence.

Thus for each utterance we have confidence score, and a pair of phoneme sequences: the decoded phoneme sequence, and the true phoneme sequence. We refer to this entire collection as the recognized corpus, and denote it as P.

The recognized corpus constitutes the output of the corpus processing step.

Iterative Development of Probability Model Family

From the preceding step, we have at our disposal the recognized corpus P, comprising a large number of pairs of phoneme sequences.

In this step, we iteratively develop a sequence of probability model families. That is, we repeatedly pass through the recognized corpus, analyzing each pair of phoneme sequences to collect information regarding the confusability of any two phonemes. At the end of each pass, we use the information just collected to generate an improved family of probability models. We repeat the procedure until there is no further change in the family of probability models, or the change becomes negligible.

It is important to understand that this step as a whole comprises repeated iterations. In the detailed discussion below, we describe a single iteration, and the criterion for declaring the step as a whole complete.

The output of this step is a family of probability models, which estimates the acoustic confusability of any two members of the augmented phoneme alphabet $\Phi'$. From these estimates, by another method that we explain, we may then derive the acoustic confusability measure that we seek.

DETAILED DESCRIPTION OF THE METHOD

We now provide detailed descriptions of the steps outlined above.

Corpus Processing

Let $X = \{\langle u_1, T_1 \rangle, \ldots, \langle u_C, T_C \rangle\}$ be the corpus, comprising C pairs of utterances and transcriptions. For each $\langle u, T \rangle$ pair in X:

1. Recognize. Apply the recognizer R (or for a grammar-based system, the recognizer $R_G$, where G is a grammar that admits every transcription in the corpus, plus possibly other phrases that are desired to be recognized) to the utterance u, yielding as output a decoded frame sequence f and a confidence score s.

2. Optionally Map Phonemes. This step is optional. Let $f = f_1 f_2 \ldots f_F$ be the decoded frame sequence. Apply a phoneme map m to each element of the decoded frame sequence, yielding a new decoded frame sequence
f'=f'$_1$f'$_2$ ... f'$_F$, where each f'$_j$=m(f$_j$).

The purpose of the phoneme map m is to reduce the effective size of the phoneme alphabet, by collapsing minor variants within the phoneme alphabet into a single phoneme. An example would be the mapping of the "p closure" phoneme, often denoted pcl, to the regular p phoneme. Another example would be splitting phoneme pairs, known as diphones, into separate phonemes. This operation can simplify the calculation, and avoids the problem of too finely subdividing the available statistical evidence, which can lead to unreliable estimates of phoneme confusability.

However, this operation may be skipped, or in what amounts to the same thing, the map m may be the identity map on the phoneme alphabet.

Note: it will be obvious to one skilled in the art, that by suitable modification the map m may function to expand rather than to reduce the phoneme alphabet, for instance by including left and/or right phonetic context in the output phoneme. This modification is also claimed as part of this invention.

3. Coalesce. Let f'=f'$_1$f'$_2$ ... f'$_F$, be the decoded frame sequence, optionally after the application of Step 2. We now perform the operation of coalescing identical sequential phonemes in the decoded frame sequence, to obtain the decoded phoneme sequence. This is done by replacing each subsequence of identical contiguous phonemes that appear in f' by a single phoneme of the same type.

Thus if $$f'=r\ r\ r\ r\ eI\ eI\ z\ z\ z\ z$$

is the decoded frame sequence, comprising 10 frames, the result of coalescing f' is the decoded phoneme sequence $$d=r\ eI\ z.$$

Here and above, r, eI and z are all members of the phoneme alphabet $\Phi$. This phoneme sequence corresponds to the regular English language word "raise." Note that d has three elements, respectively $d_1$=r, $d_2$=eI, and $d_3$=z.

We denote the coalescing operation by the letter g, and write d=g(f') for the action described above.

4. Generate Pronunciation of T. Let T be the transcription of u. By lookup in the dictionary of the recognition system, or by use of the system's automatic pronunciation generation system, generate a pronunciation t for T, also written t=q(T). Thus if T is the regular English word "hazy," then one possibility is $$t=h\ eI\ z\ i:$$

As above, h, eI, z, and i: are all members of the phoneme alphabet $\Phi$. Note that t has four elements, respectively $t_1$=h, $t_2$=eI, $t_3$=z, and $t_4$=i:.

It should be noted that there may be more than one valid pronunciation for a transcription T. There are a number of ways of dealing with this:

(a) Decode the utterance u with a grammar-based recognizer R$_G$, where the grammar G restricts the recognizer to emit only the transcription T(u). This is known as a "forced alignment," and is the preferred embodiment of the invention.
(b) Pick the most popular pronunciation, if this is known.
(c) Pick a pronunciation at random.
(d) Use all of the pronunciations, by enlarging the corpus to contain as many repetitions of u as there are pronunciations of T(u), and pairing each distinct pronunciation with a separate instance of u.
(e) Pick the pronunciation that is closest, in the sense of string edit distance, to the decoded phoneme sequence d.

By applying these steps sequentially to each element of the corpus X, we obtain the recognized corpus P={<u1, d(u1), t(u1), s(u1)>, ..., <uC, d(uC), t(uC), s(uC)>}, or more succinctly P={<u1, d1, t1, s1>, ..., <uC, dC, tC, sC>}.

Iterative Development of Probability Model Family

We now give the algorithm for the iterative development of the required probability model family, $\Pi$={p(d|t)}.

1. Begin with the recognized corpus P.
2. Establish a termination condition $\tau$. This condition typically depends on one or more of: the number of iterations executed, the closeness of match between the previous and current probability family models, respectively $\Pi_{(m-1)}$ and $\Pi_{(m)}$, or some other consideration. To exhibit this dependency explicitly, we write $\tau(m, \Pi_{(m-1)}, \Pi_{(m)})$.
3. Define the family of decoding costs $\{\delta_{(0)}(x|y)|x, y$ in $\Phi'\}$ as follows $$\delta_{(0)}(x|\epsilon)=2 \text{ for each } x \text{ in } \Phi$$

$$\delta_{(0)}(\epsilon|x)=3 \text{ for each } x \text{ in } \Phi$$

$$\delta_{(0)}(x|x)=0 \text{ for each } x \text{ in } \Phi'$$

$$\delta_{(0)}(x|y)=1 \text{ for each } x, y \text{ in } \Phi, \text{ with } x \neq y.$$

Note: these settings are exemplary, and not a defining characteristic of the algorithm. Practice has shown that the algorithm is not very sensitive to these values, so long as $\delta_{(0)}(x|x)=0$, and the other quantities are greater than 0.

4. Set the iteration count m to 0.
5. For each x, y in $\Phi'$, set the phoneme pair count c(x|y) to 0.
6. For each entry <u, d, t, s> in P, perform the following (these steps are explained in greater detail below):
   a. Construct the lattice L=d×t.
   b. Populate the lattice arcs with values drawn from the current family of decoding costs, $\{\delta_{(m)}(x|Y)\}$.
   c. Apply the Bellman-Ford dynamic programming algorithm, or Dijkstra's minimum cost path first algorithm, to find the shortest path through this lattice, from the upper-left (source) node to the lower-right (terminal) node. The minimum cost path comprises a sequence of arcs A=$a_1, a_2, \ldots, a_K$, in the lattice L, where the tail of arc $a_1$ is the source node, the head of arc $a_K$, is the terminal node, and the head of arc $a_i$ is the tail of arc $a_{i+1}$, for each i=1, ... K−1.
   d. Traverse the minimum cost path determined in step c. Each arc of the path is labeled with some pair x|y, where x and y are drawn from $\Phi'$. For each x|y arc that is traversed, increment the phoneme pair count c(x|y) by 1.
7. For each y in $\Phi'$, compute c(y)=$\Sigma$c(x|y), where the sum runs over all x in $\Phi'$.
8. Estimate the family of probability models $\Pi_{(m)}$={p$_{(m)}$(x|y)}. For each fixed y in $\Phi'$, this is done by one of the following two formulae:
   a. If c(x|y) is non-zero for every x in $\Phi'$, then set p$_{(m)}$(x|y)=c(x|y)/c(y), for each x in $\Phi'$.
   b. If c(x|y) is zero for any x in $\Phi'$, apply any desired zero-count probability estimator, also known as a smoothing estimator, to estimate p$_{(m)}$(x|y). A typical method is Laplace's law of succession, which is p$_{(m)}$(x|y)=(c(x|y)+1)/(c(y)+|$\Phi'$|), for each x in $\Phi'$.

9. If m>0, test the termination condition $\tau(m, \Pi_{(m-1)}, \Pi_{(m)})$. If the condition is satisfied, return $\Pi_{(m)}$ as the desired probability model family $\Pi=\{p(d|t)\}$ and stop.
10. If the condition is not satisfied, define a new family of decoding costs $\{\delta_{(m+1)}(x|y)|x, y \text{ in } \Phi'\}$ by $\delta_{(m+1)}(x|y)=-\log p_{(m)}(x|y)$. (The logarithm may be taken to any base greater than 1.)
   Note that each $p_{(m)}(x|y)$ satisfies $0<p_{(m)}(x|y)<1$, and so each $\delta_{(m+1)}(x|y)>0$.
11. Increment the iteration counter m and return to step 5 above.

We now provide the additional discussion promised above, to explain the operations in Step 6 above.

Step 6a: Consider the entry <u, d, t, s> of P, with decoded phoneme sequence $d=d_1 d_2 \ldots d_N$, containing N phonemes, and true phoneme sequence $t=t_1 t_2 \ldots t_Q$ containing Q phonemes. Construct a rectangular lattice of dimension (N+1) rows by (Q+1) columns, and with an arc from a node (i, j) to each of nodes (i+1, j), (i, j+1) and (i+1, j+1), when present in the lattice. (Note: "node (i, j)" refers to the node in row i, column j of the lattice.) The phrase "when present in the lattice" means that arcs are created only for nodes with coordinates that actually lie within the lattice. Thus, for a node in the rightmost column, with coordinates (i, Q), only the arc (i, Q) γ(i+1, Q) is created.)

Step 6b: Label
   each arc (i, j)→(i, j+1) with the cost $\delta_{(m)}(\epsilon|t_j)$
   each arc (i, j)→(i+1, j) with the cost $\delta_{(m)}(d_i|\epsilon)$
   each arc (i, j)→(i+1, j+1) with the cost $\delta_{(m)}(d_i|t_j)$.

Figure 2:
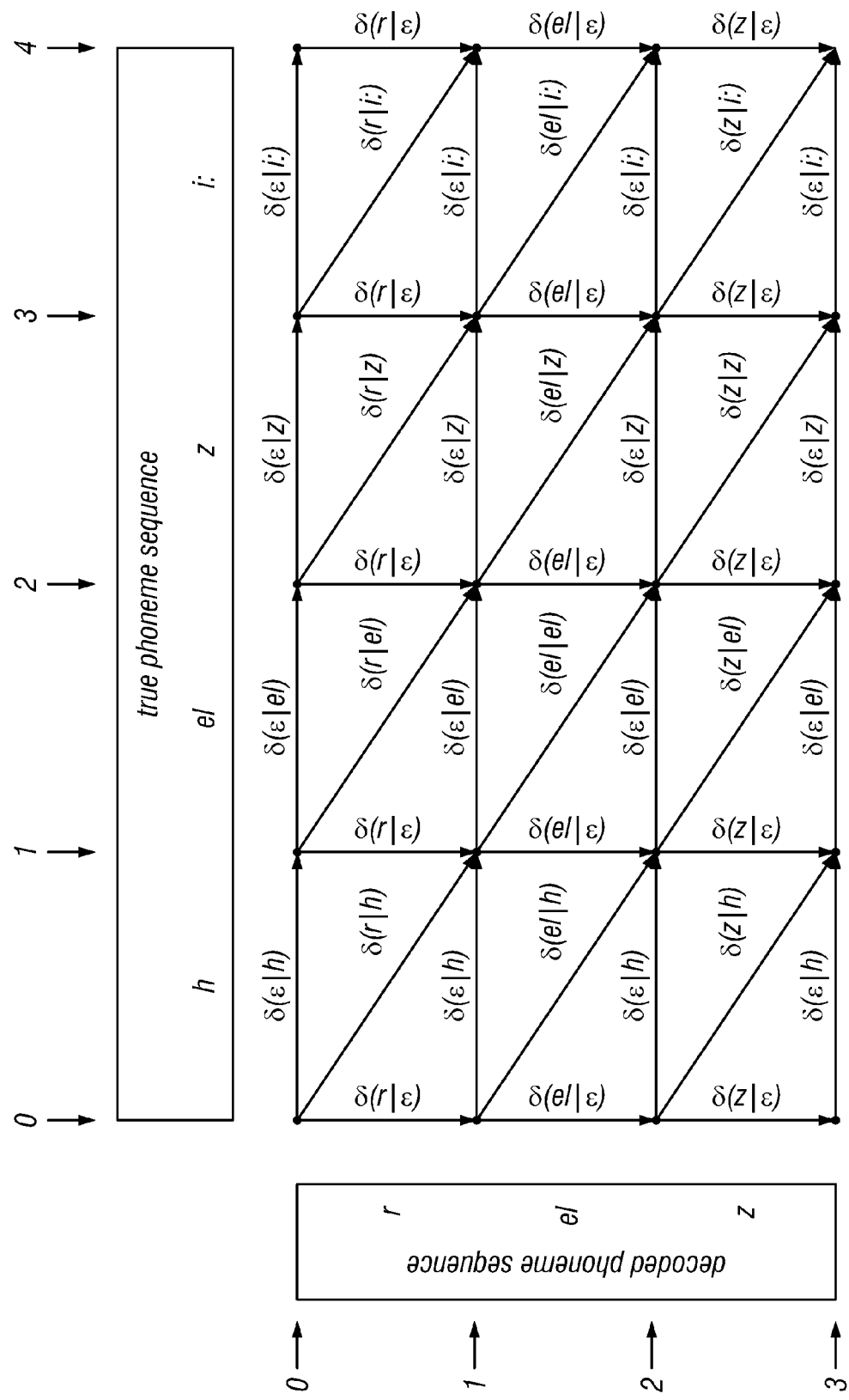
FIG. 2 shows a basic lattice with actual phonemes according to the invention, where the purely symbolic phonemes $d_1$ etc. have been replaced by actual phonemes from the SAMPA phoneme alphabet for US English. The true phoneme sequence shown is a pronunciation of the English word "hazy," the decoded phoneme sequence is a pronunciation of the word "raise;"
Figure 3:
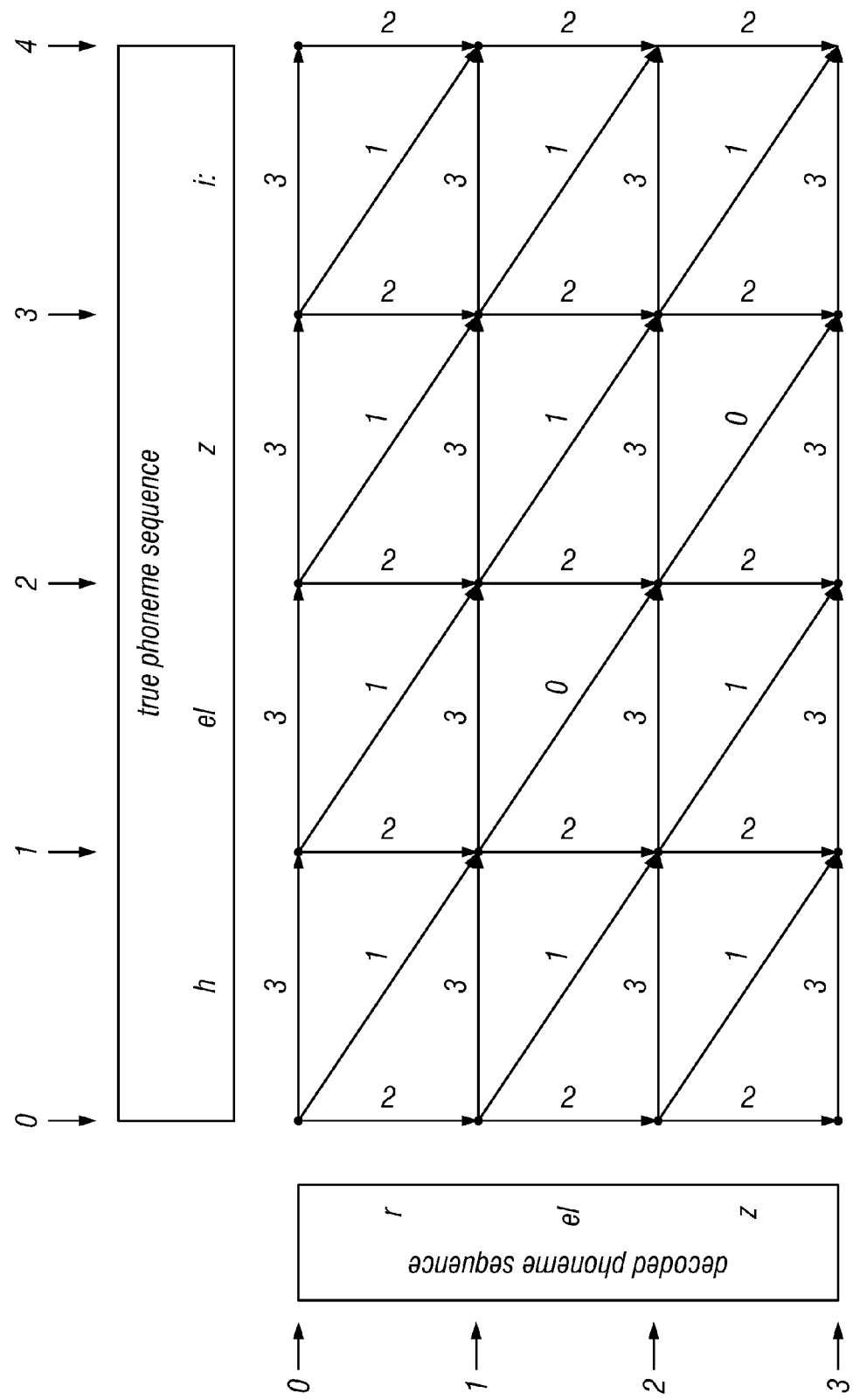
FIG. 3 shows a basic lattice with actual decoding costs according to the invention, where the symbolic decoding costs $\delta(d|t)$ have been replaced by the starting values proposed in the text.

An example of such a lattice appears, in various versions, in FIGS. 1, 2, and 3 below. FIG. 1 exhibits the lattice labeled with symbols, for the case where N=3 and Q=4, with symbolic expressions for decoding costs. FIG. 2 shows the lattice for the particular case d=r eI z and t=h eI z i:, again with symbolic expressions for decoding costs. FIG. 3 shows the same lattice, with the actual decoding costs for iteration 0 filled in.

Step 6c: The Bellman-Ford dynamic programming algorithm is a well-known method for finding the shortest path through a directed graphic with no negative cycles. We apply it here to find the shortest path from the source node, which we define as node (0, 0), to the terminal node, which we define as node (N, Q).

FIGS. 4, 5, 6, and 7 below demonstrate the application of the Bellman-Ford algorithm to the example of FIG. 3.

Figure 4:
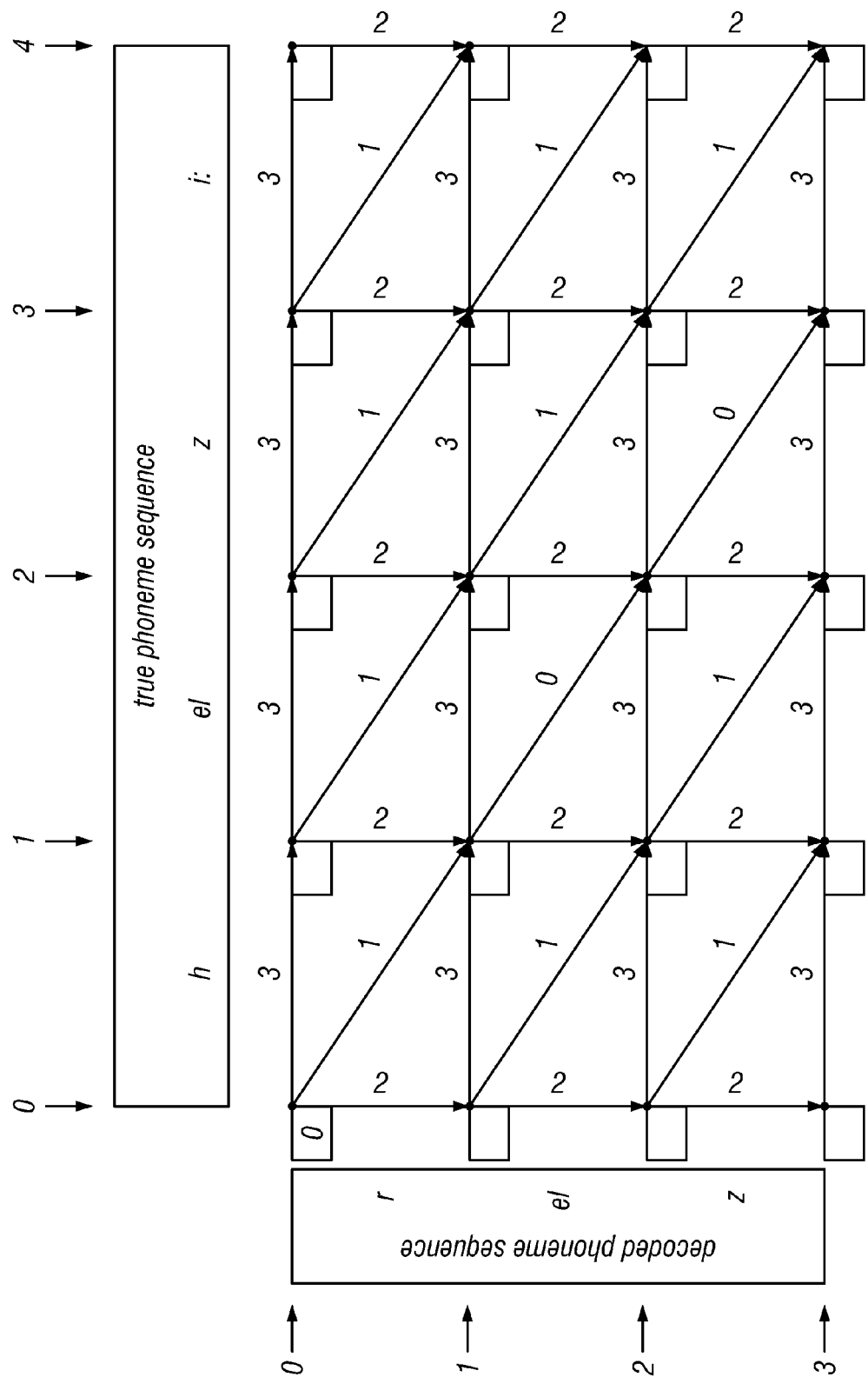
FIG. 4: Initial State of Bellman-Ford Algorithm. Each node now has a box to record the minimum-path cost from the source node, at coordinates (0, 0), to the node in question. The cost from the source node to itself is 0, so that value has been filled. In accordance with the invention.

FIG. 4 shows the initial state of the algorithm, with the source node labeled with the minimum cost for reaching that node from the source node, which of course is 0.

Figure 5:
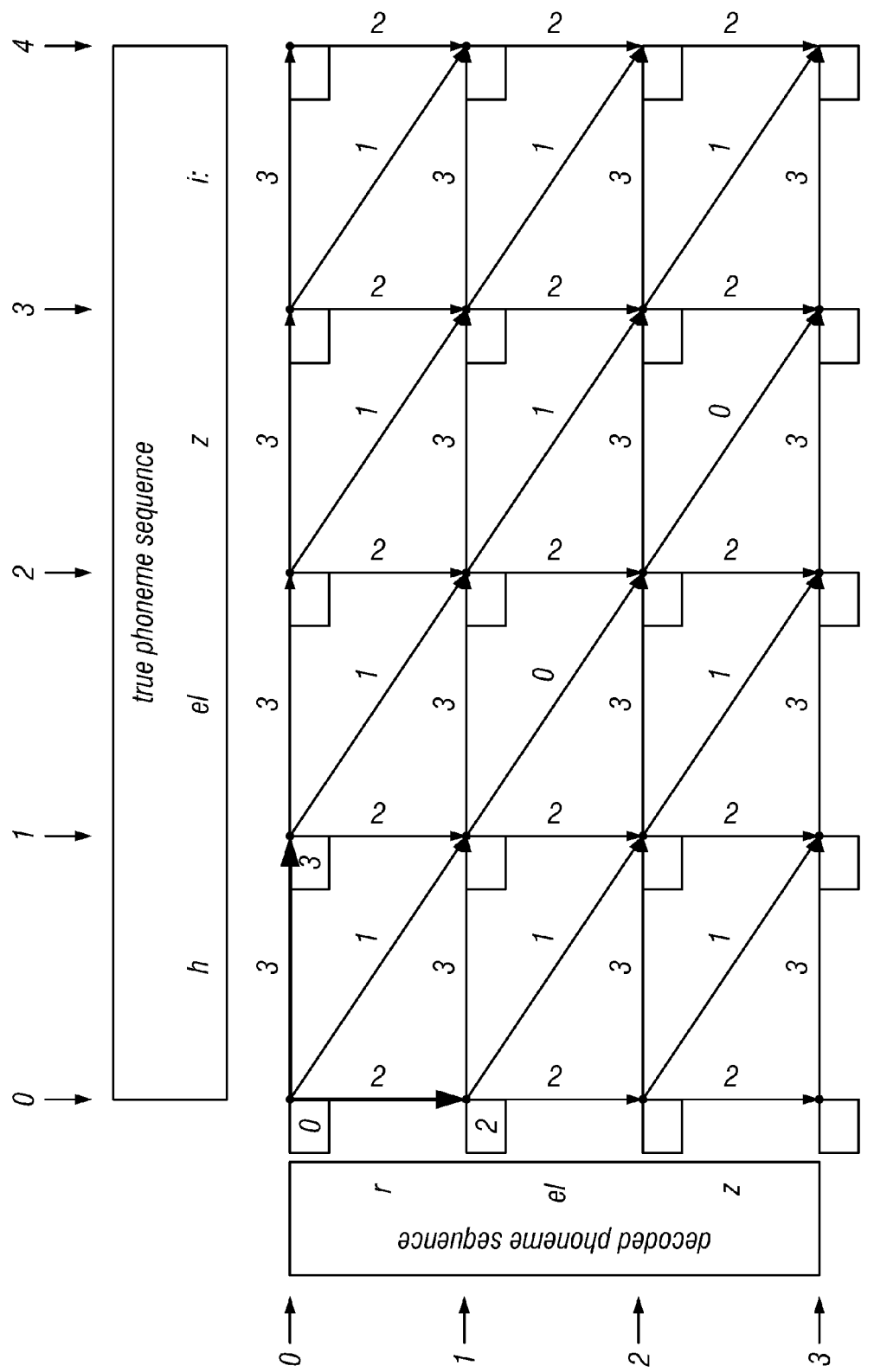
FIG. 5 shows two nodes with minimum path costs after labeling according to the invention, where the costs to reach nodes (0, 1) and (1, 0) have been determined and filled in, and the arcs of the minimum cost path in each case have been marked, by rendering them with a thicker line.

FIG. 5 shows the state of the algorithm after labeling nodes (0, 1) and (1, 0) with the minimum cost for reaching those nodes from the source node. The arcs traversed to yield the minimum cost has also been exhibited, by thickening the line of the arc.

Because there is only a single arc incident on each of these nodes, the minimum costs are respectively 0+3=3 and 0+2=2. In each case, this quantity is determined as (minimum cost to reach the immediately preceding node)+(cost of traversing the arc from the immediately preceding node).

Figure 6:
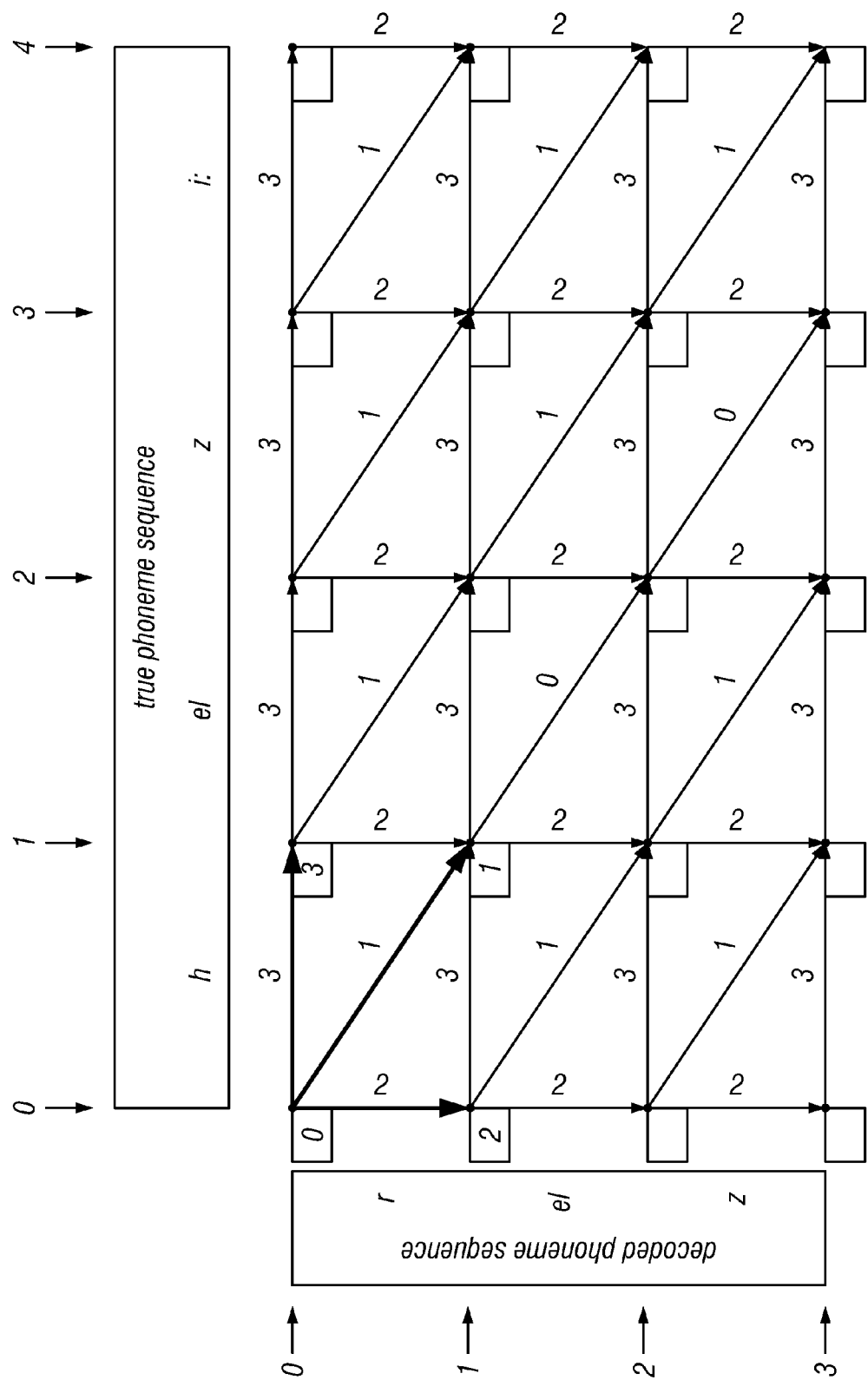
FIG. 6 shows the state of the lattice after a next step of the algorithm according to the invention, where the cost of the minimum cost path to (1, 1), and the arc followed for that path, have both been determined. This is the first non-trivial step of the algorithm. The result is determined as described in the text.

FIG. 6 shows the state of the algorithm after labeling node (1, 1). The computation here is less trivial, and we review it in detail. Node (1, 1) has three immediate predecessors, respectively (0, 0), (0, 1) and (1, 0). Each node has been labeled with its minimum cost, and so we may compute the minimum cost to (1, 1). This of course is the minimum among the three possible paths to (1, 1), which are:
   from (0, 0), via arc (0, 0)→(1, 1), with total cost 0+1=1
   from (0, 1), via arc (0, 1)→(1, 1), with total cost 3+2=5
   from (1, 0), via arc (1, 0)→(1, 1), with total cost 2+3=5.

It is evident that the path from (0, 0) is the minimum cost path, and this is indicated in FIG. 6.

Figure 7:
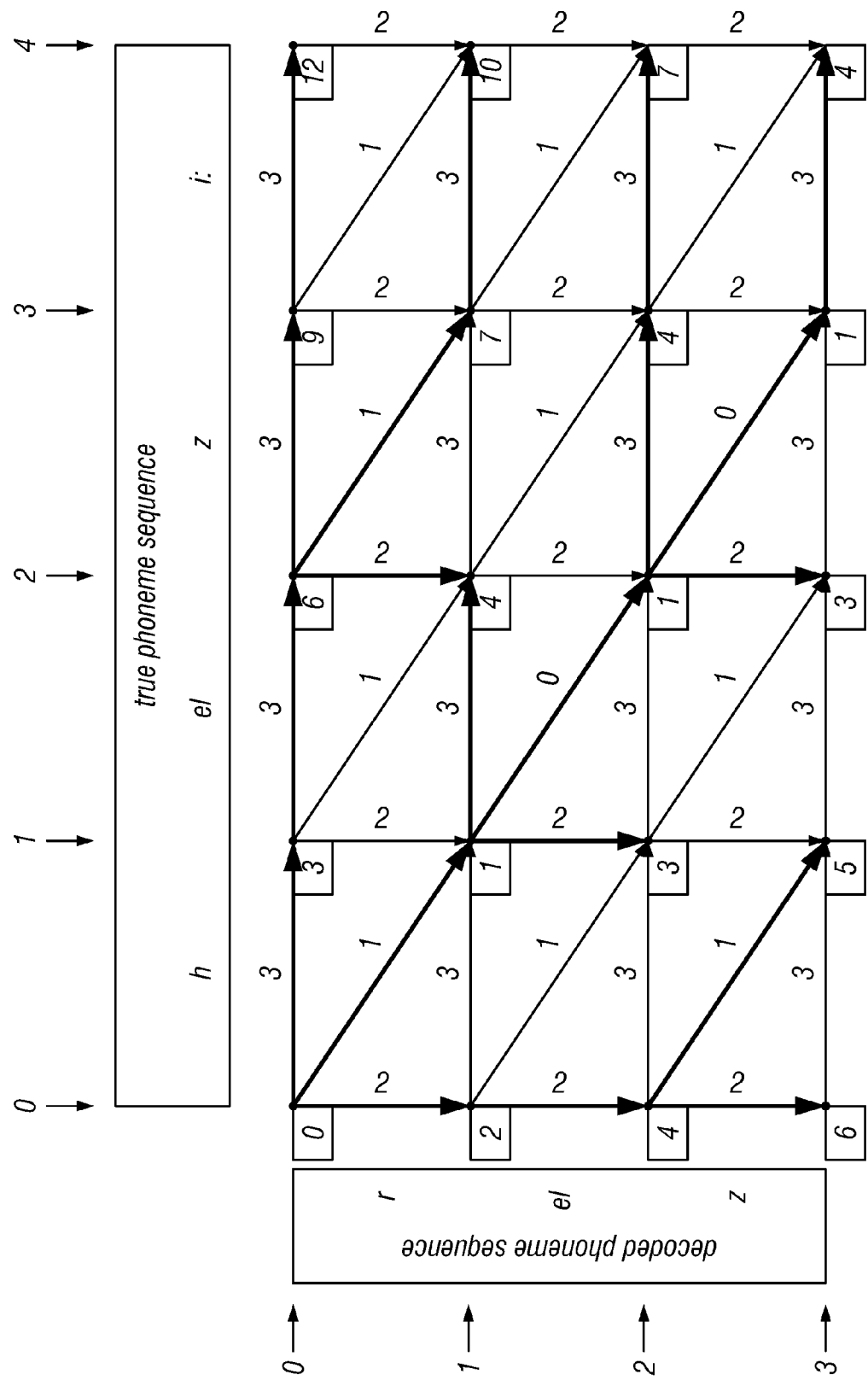
FIG. 7 shows the state of the lattice after completion of the algorithm according to the invention, where every node has been labeled with its minimum cost path, and the associated arcs have all been determined; and where some arbitrary choices, between paths of equal cost, have been made in selecting the minimum cost arcs.

By repeated application of this process, the minimum cost path from the source node to each node of the lattice may be determined. FIG. 7 shows the final result.

Because the arc costs are guaranteed to be non-negative, it is evident to one skilled in the art that the same computation may be performed, at possibly lower computational cost, using Dijkstra's shortest path first algorithm. The improvement follows from the fact that only the minimum cost path from the source node to the terminal node is required, and so the algorithm may be halted as soon as this has been determined.

The output of this step is a sequence of arcs $A=a_1, a_2, \ldots, a_K$, in the lattice L, known to comprise the minimum cost path from the source node to the terminal node. We write l(a) for the phoneme pair x|y that labels the arc a.

Step 6d: For each arc $a_i$ in the minimum cost path A, labeled with phoneme pair $x|y=l(a_i)$, increment the counter c(x|y) by 1.

This completes the description of the method to construct an empirically derived acoustic confusability measure. The means of using the result of this algorithm to compute the acoustic confusability of two arbitrary phrases is described below.

N-Best Variant of the Method

An important variant of the just-described method to construct an empirically derived acoustic confusability measure, which can improve the accuracy of the resulting measure, is as follows.

It is well known to those skilled in the art that the output of a recognizer R (or $R_G$, for a grammar-based recognition system), may comprise not a single decoding D, comprising a pair f, s, but a so-called "N-best list," comprising a ranked series of alternate decodings, written $f_1, s_1, f_2, s_2, \ldots, f_B, s_B$. In this section we explain a variant of the basic method described above, called the "N-Best Variant," which makes use of this additional information. The N-best variant involves changes to both the corpus processing step, and the iterative development of probability model family step, as follows.

N-Best Variant Corpus Processing

In the N-best variant of corpus processing, for each utterance u, each entry $f_i(u), s_i(u)$ in the N-best list is treated as a separate decoding. All other actions, taken for a decoding of u, are then performed as before. The result is a larger recognized corpus P'.

N-Best Variant Iterative Development of Probability Model Family

In the N-best variant of iterative development of probability model family, there are two changes. First, the input is the larger recognized corpus, P', developed as described immediately above. Second, in step 6d, as described above, when processing a given entry <u, d, t, s> of P', each count c(x|y) is incremented by the value s, which is the confidence score of the given entry, rather than by 1.

The rest of the algorithm is unchanged.

3. Method to Compute the Empirically Derived Acoustic Confusability of Two Phrases In the preceding sections we described how to determine the desired probability model family $\Pi=\{p(d|t)\}$. In this section we explain how to use $\Pi$ to compute the acoustic confusability of two arbitrary phrases w and v.

Specifically, we give algorithms for computing two quantities, both relating to acoustic confusability. The first is the raw phrase acoustic confusability $r(v|w)$. This is a measure of the acoustic similarity of phrases v and w. The second is the grammar-relative confusion probability $p(v|w, G)$. This is an estimate of the probability that a grammar-constrained recognizer $R_G$ returns the phrase v as the decoding, when the true phrase was w. Note that no reference is made to any specific pronunciation, in either quantity.

In both cases, we must come to grips with the fact that the phrases v and w may have multiple acceptable pronunciations. There are a variety of ways of dealing with this, all of which are claimed as part of this patent.

In the process of computing these quantities, we also give expressions that depend upon specific pronunciations (and from which the pronunciation-free expressions are derived). These expressions have independent utility, and also are claimed as part of this patent.

Computation of Raw Pronunciation Acoustic Confusability $r(q(v)|q(w))$ and Raw Phrase Acoustic Confusability $r(v|w)$ We first assume that pronunciations $q(w) \in Q(w)$ and $q(v) \in Q(v)$ are given, and explain the computation of the raw pronunciation acoustic confusability, $r(q(v)|q(w))$. Then we explain methods to determine the raw phrase acoustic confusability $r(v|w)$.

Computation of Raw Pronunciation Acoustic Confusability

Let the probability model family $\Pi = \{p(d|t)\}$ and the pronunciations $q(w)$ and $q(v)$ be given. Proceed as follows to compute the raw pronunciation acoustic confusability $r(q(v)|q(w))$:

1. Define the decoding costs $\delta(d|t) = -\log p(d|t)$ for each d, $t \in \Phi'$.
2. Construct the lattice $L = q(v) \times q(w)$, and label it with phoneme decoding costs $\delta(d|t)$, depending upon the phonemes of $q(v)$ and $q(w)$. This means performing the actions of Steps 6a and 6b, as described above, "Iterative Development of Probability Model Family," with the phoneme sequences $q(v)$ and $q(w)$ in place of d and t respectively.
3. Perform the actions of Step 6c above to find the minimum cost path $A = a_1, a_2, \ldots, a_K$, from the source node to the terminal node of L.
4. Compute S, the cost of the minimum cost path A, as the sum of the decoding costs $\delta(l(a))$ for each arc $a \in A$. (Recall that $l(a)$ is the phoneme pair $x|y$ that labels a.) Thus, $$S = \sum_{i=1}^{K} \delta(l(a_i)).$$

5. Compute $r(q(v)|q(w)) = \exp(-S)$; this is the raw pronunciation acoustic confusability of $q(v)$ and $q(w)$. Here the exponential is computed to the same base as that used for the logarithm, in preceding steps.

Note that equivalently $$r(q(v)|q(w)) = \prod_{i=1}^{K} p(l(a_i)),$$

and indeed this quantity may be computed directly from the lattice L, by suitable modification of the steps given above.

We have described here one method of computing a measure of the acoustic confusability $r(q(v)|q(w))$ of two pronunciations, $q(w)$ and $q(v)$. In what follows we describe methods of manipulating this measure to obtain other useful expressions. It is to be noted that while the expressions developed below assume the existence of some automatic means of quantitatively expressing the confusability of two pronunciations, they do not depend on the exact formulation presented here, and stand as independent inventions.

Computation of Raw Phrase Acoustic Confusability

We begin by defining $r(v|q(w)) = \Sigma r(q(v)|q(w))$, where the sum proceeds over all $q(v) \in Q(v)$. This accepts any pronunciation $q(v)$ as a decoding of v. The raw phrase acoustic confusability $r(v|w)$, with no reference to pronunciations, may then be determined by any of the following means:

1. Worst Case, Summed. Find $q(w) \in Q(w)$ that minimizes $r(w|q(w))$; call this $q\dagger(w)$. Thus $q\dagger(w)$ is the pronunciation of w that is least likely to be correctly decoded. Set $r(v|w) = r(v|q\dagger(w))$. This is the preferred implementation.
2. Worst Case, Individual Pronunciations. For $v \neq w$, set $r(v|w) = \max\{r(q(v)|q(w))\}$, where the maximum is taken over all $q(v) \in Q(v)$ and $q(w) \in Q(w)$. For $v = w$, set $r(w|w) = \min\{r(q(w)|q(w))\}$, where the minimum is taken over all $q(w) \in Q(w)$. Since higher values of $r(q(v)|q(w))$ imply greater confusability, this assigns to $r(v|w)$ the raw pronunciation confusability of the two most confusable pronunciations of v and w respectively. This is the preferred method.
3. Most Common. Assume the two most common pronunciations of v and w are known, respectively $q^*(v)$ and $q^*(w)$. Set $r(v|w) = r(q^*(v)|q^*(w))$.
4. Average Case. Assume that a probability distribution on $Q(w)$ is known, reflecting the empirical distribution, within the general population, of various pronunciations $q(w)$ of w. Set $r(v|w) = \tau p(q(w)) r(v|q(w))$, where the sum proceeds over all $q(w) \in Q(w)$.
5. Random. Randomly select $q(v) \in Q(v)$ and $q(w) \in Q(w)$, and set $r(v|w) = r(q(v)|q(w))$.

Those skilled in the art will observe ways to combine these methods into additional hybrid variants, for instance by randomly selecting $q(v)$, but using the most common pronunciation $q^*(w)$, and setting $r(v|w) = r(q(v)|q^*(w))$.

Computation of Grammar-Relative Pronunciation Confusion Probability $p(q(v)|q(w), G)$ and Grammar-Relative Phrase Confusion Probability $p(v|w, G)$ Suppose that a recognizer is constrained to recognize phrases within a grammar G. We proceed to define expressions that estimate the grammar-relative pronunciation confusion probability $p(q(v)|q(w), G)$, and the grammar-relative phrase confusion probability $p(v|w, G)$.

In what follows we write $L(G)$ for the set of all phrases admissible by the grammar G, and $Q(L(G))$ for the set of all pronunciations of all such phrases. By assumption $L(G)$ and $Q(L(G))$ are both finite.

Computation of Grammar-Relative Pronunciation Confusion Probability $p(q(v)|q(w), G)$ Let two pronunciations $q(v), q(w) \in Q(L(G))$ be given; exact homonyms, that is $q(v) = q(w)$, are to be excluded. We estimate $p(q(v)|q(w), G)$, the probability that an utterance corresponding to the pronunciation $q(w)$ is decoded by the recognizer $R_G$ as $q(v)$, as follows.

1. Compute the normalizer of $q(w)$ relative to G, written $Z(q(w), G)$, as $Z(q(w), G) = \Sigma r(q(x)|q(w))$, where the sum extends over all $q(x) \in Q(L(G))$, excluding exact homonyms (that is, cases where $q(x) = q(w)$, for $x \neq w$).

2. Set $p(q(v)|q(w), G) = r(q(v)|q(w))/Z(q(w), G)$.

Note: by virtue of the definition of the normalizer, this is in fact a probability distribution over $Q(L(G))$.

Computation of Grammar-Relative Phrase Confusion Probability $p(v|w, G)$

Let two phrases $v, w \in L(G)$ be given. We estimate $p(v|w, G)$, the probability that an utterance corresponding to any pronunciation of w is decoded by the recognizer $R_G$ as any pronunciation of v, as follows.

As above we must deal with the fact that there are in general multiple pronunciations of each phrase. We proceed in a similar manner, and begin by defining $p(v|q(w), G) = \Sigma p(q(v)|q(w), G)$, where the sum is taken over all $q(v) \in Q(v)$. We may then proceed by one of the following methods:

1. Worst Case, Summed. Find $q(w) \in Q(w)$ that minimizes $p(w|q(w), G)$; call this $q\dagger(w)$. Thus $q\dagger(w)$ is the pronunciation of w that is least likely to be correctly decoded. Set $p(v|w, G) = p(v|q\dagger(w), G)$. This is the preferred implementation.
2. Worst Case, Individual Pronunciations. For $v \neq w$, set $p'(v|w, G) = \max \{p(q(v)|q(w), G)\}$, where the maximum is taken over all $q(v) \in Q(v)$ and $q(w) \in Q(w)$. For $v=w$, set $p'(w|w, G) = \min \{p(q(w)|q(w), G)\}$, where the minimum is taken over all $q(w) \in Q(w)$. Renormalize the set of numbers $\{p'(x|w, G)\}$ to obtain a new probability distribution $p(x|w, G)$.
3. Most Common. Assume the most common pronunciation of w is known, denoted $q^*(w)$. Set $p(v|w, G) = p(v|q^*(w), G)$.
4. Average Case. Assume the empirical distribution $p(q(w))$ over $Q(w)$ is known. Set $p(v|w, G) = \Sigma p(q(w)) p(v|q(w), G)$, where the sum is taken over all $q(w) \in Q(w)$.
5. Random. For any given $v, w \in L(G)$, randomly select $q(v)$ and $q(w)$ from $Q(v)$ and $Q(w)$ respectively, and set $p'(v|w, G) = p(q(v)|q(w), G)$. Renormalize the set of numbers $\{p'(x|w, G)\}$ to obtain a new probability distribution $p(x|w, G)$.

4. Techniques for Efficient Computation of Empirically Derived Acoustic Confusability Measures In applying measures of acoustic confusability, it is typically necessary to compute a very large number of grammar-relative pronunciation confusion probabilities, $p(q(v)|q(w), G)$, which ultimately depend upon the quantities $r(q(v)|q(w))$ and $Z(q(w), G)$. We now explain three methods for improving the efficiency of these computations.

Partial Lattice Reuse

For a fixed $q(w)$ in $Q(L(G))$, it is typically necessary to compute a large number of raw pronunciation confusability values $r(q(v)|q(w))$, as $q(v)$ takes on each or many values of $Q(L(G))$. In principle for each $q(v)$ this requires the construction, labeling and minimum-cost-path computation for the lattice $L = q(v) \times q(w)$, and this is prohibitively expensive.

This computation can be conducted more efficiently by exploiting the following observation. Consider two pronunciations $q(v_1) = d_{11}, d_{12}, \ldots, d_{1Q1}$ and $q(v_2) = d_{21}, d_{22}, \ldots, d_{2Q2}$. Suppose that they share a common prefix; that is, for some $M \leq Q1, Q2$ we have $d_{1j} = d_{2j}$ for $j=1, \ldots, M$. Then the first M rows of the labeled and minimum-cost-path-marked lattice $L_1 = q(v_1) \times q(w)$ can be reused in the construction, labeling and minimum-cost-path computation for lattice $L_2 = q(v_2) \times q(w)$.

The reuse process consists of retaining the first (M+1) rows of nodes of the $L_1$ lattice, and their associated arcs, labels and minimum-cost-path computation results, and then extending this to the $L_2$ lattice, by adjoining nodes, and associated arcs and labels, corresponding to the remaining Q2−M phonemes of $q(v_2)$. Thereafter, the computation of the required minimum-cost-path costs and arcs proceeds only over the newly-added Q2−M bottom rows of $L_2$.

For instance, continuing the exemplary lattice illustrated earlier, suppose q(w)=h eI z i:, and take $q(v_1)$=r eI z (a pronunciation of "raise") and $q(v_2)$=r eI t (a pronunciation of "rate"). Then to transform $L_1 = q(v_1) \times q(w)$ into $L_2 = q(v_2) \times q(w)$ we first remove all the bottom row of nodes (those with row index of 3), and all arcs incident upon them. These all correspond to the phoneme "z" in $q(v_1)$. (However, we retain all other nodes, and all labels, values and computational results that mark them.) Then we adjoin a new bottom row of nodes, and associated arcs, all corresponding to the phoneme "t" in $q(v_2)$.

Note that it is possible, for example if $q(v_2)$=r eI (a pronunciation of "ray"), that no additional nodes need be added, to transform $L_1$ into $L_2$. Likewise, if for example $q(v_2)$=r eI z @ r (a pronunciation of "razor"), it is possible that no nodes need to be removed.

This procedure may be codified as follows:
1. Fix $q(w)$ in $Q(L(G))$. Construct an initial "empty" lattice $L_0$, consisting of only the very top row of nodes and arcs, corresponding to $q(w)$.
2. Sort $Q(L(G))$ lexicographically by phoneme, yielding an enumeration $q(v_1), q(v_2), \ldots$
3. Set the iteration counter $i=1$.
4. Find the length M of the longest common prefix of $q(v_{i-1}) = d_{i-1\ 1}, d_{i-1\ 2}, \ldots, d_{i-1\ Qi-1}$ and $q(v_i) = d_{i\ 1}, d_{i\ 2}, \ldots, d_{i\ Qi}$. This is the largest integer M such that $d_{i-1\ j} = d_{ij}$ for $j=1, \ldots, M$.
5. Construct lattice $L_i$ from $L_{i-1}$ as follows:
   a. Remove the bottom $Q_{i-1}$−M rows of nodes (and associated arcs, costs and labels) from $L_{i-1}$, corresponding to phonemes $d_{i-1\ M+1}, \ldots, d_{i-1\ Qi-1}$ of $q(v_{i-1})$, forming interim lattice $L^*$.
   b. Adjoin $Q_i$−M rows of nodes (and associated arcs, labeled with costs) to the bottom of $L^*$, corresponding to phonemes $d_{i\ M+1}, \ldots, d_{i\ Qi}$ of $q(v_i)$, forming lattice $L_i = q(v_i) \times q(w)$.
6. Execute the Bellman-Ford or Dijkstra's shortest path first algorithm on the newly-added portion of $L_i$. Compute the value of $r(q(v_i)|q(w))$ and record the result.
7. Increment the iteration counter i. If additional entries of $Q(L(G))$ remain, go to step 4. Otherwise stop.

It will be obvious to one skilled in the art that this same technique may be applied, with appropriate modifications to operate on the columns rather than the rows of the lattice in question, by keeping $q(v)$ fixed, and operating over an enumeration $q(w_1), q(w_2), \ldots$ of $Q(L(G))$ to compute a sequence of values $r(q(v)|q(w_1)), r(q(v)|q(w_2)), \ldots$ Pruning One application of acoustic confusability measures is to find phrases within a grammar, vocabulary or phrase list that are likely to be confused. That is, we seek pairs of pronunciations $q(v), q(w)$, both drawn from $Q(L(G))$, with $v \neq w$, such that $r(q(v)|q(w))$, and hence ultimately $p(q(v)|q(w), G)$, is large.

In principle, this involves the computation of $r(q(v)|q(w))$ for some $|Q(L(G))|^2$ distinct pronunciation pairs. Because it is not uncommon for $Q(L(G))$ to contain as many as 100,000 members, this would entail on the order of 10 billion acoustic confusability computations. Because of the complexity of the computation, this is a daunting task for even a very fast computer.

However, it is possible to simplify this computation, as follows. If it can be established, with a small computational effort, that $r(q(v)|q(w)) \ll r(q(w)|q(w))$, then the expensive exact computation of $r(q(v)|q(w))$ need not be attempted. In this case we declare $q(v)$ "not confusable" with $q(w)$, and take $r(q(v)|q(w))=0$ in any further computations.

We refer to such a strategy as "pruning" We now describe two complementary methods of pruning, respectively the method of Pronunciation Lengths, and the method of Pronunciation Sequences.

Pronunciation Lengths

Consider pronunciations $q(v)=d_1, d_2, \ldots, d_D$ and $q(w)=t_1, t_2, \ldots, t_T$. Suppose for a moment that $D \gg T$; in other words that $q(v)$ contains many more phonemes than $q(w)$. Then the minimum cost path through the lattice $L=q(v) \times q(w)$ necessarily traverses many edges labeled with insertion costs $\delta(x|\epsilon)$, for some x in the phoneme sequence $q(v)$. This entails a lower bound on the minimum cost path through L, which in turn entails an upper bound on $r(q(v)|q(w))$.

We now explain the method in detail. Let $q(v)=d_1, d_2, \ldots, d_D$ and $q(w)=t_1, t_2, \ldots, t_T$, and let a threshold $\Theta$ be given. (The value of $\Theta$ may be a fixed number, a function of $r(q(w)|q(w))$, or determined in some other way.) We proceed to compute an upper bound $r\dagger(q(v)|q(w))$ on $r(q(v)|q(w))$.

Let us write $\delta_i = \delta(d_i|\epsilon)$ for each phoneme $d_i$ of $q(v)$, where $i=1, \ldots, D$. Sort these costs in increasing order, obtaining a sequence $\delta_{i_1} \leq \delta_{i_2} \leq \ldots \leq \delta_{i_D}$.

Now, because D is the number of phonemes in $q(v)$, even if the T phonemes of $q(w)$ are exactly matched in the minimum cost path through the lattice, that path must still traverse at least $I=D-T$ arcs labeled with the insertion cost of some phoneme d of $q(v)$. In other words, the cost S of the minimum cost path through the lattice is bounded below by the sum of the I smallest insertion costs listed above, $S\dagger = \delta_{i_1} + \delta_{i_2} + \ldots + \delta_{i_I}$. Because $S \geq S\dagger$, and by definition $r(q(v)|q(w))=\exp(-S)$, if we take $r\dagger(q(v)|q(w))=\exp(-S\dagger)$ we have $r(q(v)|q(w)) \leq r\dagger(q(v)|q(w))$ as desired.

Note: the computation of the exponential can be avoided if we take $B=\log \Theta$, and equivalently check that $-B \leq S\dagger$.

A similar bound may be developed for the case $T \gg D$. For this case we consider the phoneme deletion costs $\delta_i = \delta(\epsilon|t_i)$ for each phoneme $t_i$ of $q(w)$, where $i=1, \ldots, T$. As before, we sort these costs, obtaining the sequence $\delta_{i_1} \leq \delta_{i_2} \leq \ldots \leq \delta_{i_T}$. Letting $E=T-D$, we form the sum $S\dagger = \delta_{i_1} + \delta_{i_2} + \ldots + \delta_{i_E}$, and proceed as before.

Pronunciation Sequences

The preceding method of Pronunciation Lengths required either $D \gg T$ or $T \gg D$, where these are the lengths of the respective pronunciation sequences. We now describe a method that may be applied, under suitable conditions, when $D \approx T$.

For each $\phi$ in $\Phi$, define $\delta_{sd}^{min}(\phi) = \min\{\delta(x|\phi)|x \in \Phi''\}$, and define $\delta_{si}^{min}(\phi) = \min\{\delta(\phi|x)|x \in \Phi'\}$. Thus $\delta_{sd}^{min}(\phi)$ is the minimum of all costs to delete $\phi$ or substitute any other phoneme for $\phi$, and likewise $\delta_{si}^{min}(\phi)$ is the minimum of all costs to insert $\phi$ or substitute $\phi$ for any other phoneme. Note that these values are independent of any particular $q(v)$ and $q(w)$, and may be computed once for all time.

To apply the method, as above let $q(v)=d_1, d_2, \ldots, d_D$ and $q(w)=t_1, t_2, \ldots, t_T$, and let a threshold $\Theta$ be given.

For each $\phi$ in $\Phi$, define $w\#(\phi)$ and $v\#(\phi)$ to be the number of times the phoneme $\phi$ appears in $q(w)$ and $q(v)$ respectively. Let $n(\phi) = w\#(\phi) - v\#(\phi)$.

Now form the sequence $W \backslash V = \phi_1, \phi_2, \ldots$, where for each $\phi$ in F with $n(\phi)>0$, we insert $n(\phi)$ copies of $\phi$ into the sequence. Note that a given $\phi$ may occur multiple times in $W \backslash V$, and observe that for each instance of $\phi$ in $W \backslash V$, the minimum cost path through the lattice $L=q(v) \times q(w)$ must traverse a substitution or deletion arc for $\phi$.

Now compute $S\dagger = \Sigma \delta_{sd}^{min}(\phi)$, where the sum runs over the entries of $W \backslash V$. It follows that S, the cost of the true minimal cost path through L, is bounded below by $S\dagger$. Hence we may define $r\dagger(q(v)|q(w)) = \exp(-S\dagger)$ and proceed as before.

A similar method applies with the sequence $V \backslash W$, where we insert $n(\phi) = v\#(\phi) - w\#(\phi)$ copies of $\phi$ in the sequence, for $n(\phi)>0$. (Note the interchange of v and w here.) We compute $S\dagger = \Sigma \delta_{si}^{min}(\phi)$, where the sum runs over the entries of $V \backslash W$, and proceed as above.

Incremental Computation of Confusability in a Sequence of Grammars

Suppose have two grammars, G and G', such that L(G) and L(G') differ from one another by a relatively small number of phrases, and hence so that Q(L(G)) and Q(L(G')) differ by only a small number of pronunciations. Let us write Q and Q' for these two pronunciation lists, respectively.

Suppose further that we have already computed a full set of grammar-relative pronunciation confusion probabilities, $p(q(v)|q(w), G)$, for the grammar G. Then we may efficiently compute a revised set $p(q(v)|q(w), G')$, as follows.

First observe that the value of a raw pronunciation confusion measure, $r(q(v)|q(w))$, is independent of any particular grammar. While Q' may contain some pronunciations not in Q, for which new values $r(q(v)|q(w))$ must be computed, most will already be known. We may therefore proceed as follows.

1. Compute any $r(q(v)|q(w))$, for $q(v)$, $q(w)$ in Q', not already known.
2. Let $A=Q' \backslash Q$, that is, newly added pronunciations. Let $B=Q \backslash Q'$, that is, discarded pronunciations.
3. Observe now that the normalizer $Z(q(w), G') = \Sigma r(q(x)|q(w))$, where the sum extends over $q(x)$ in Q', excluding exact homonyms, may be reexpressed as $Z(q(w), G') = Z(q(w), G) + \Sigma_{q(x) \in A} r(q(x)|q(w)) - \Sigma_{q(x) \in B} r(q(x)|q(w))$. Moreover, the old normalizer $Z(q(w), G')$ is available as the quotient $r(q(w)|q(w))/p(q(w)|q(w), G)$. Thus the new normalizer $Z(q(w), G')$ may be computed incrementally, at the cost of computing the two small sums.
4. Finally, $p(q(v)|q(w), G')$ may be obtained as $r(q(v)|q(w))/Z(q(w), G')$ as above.

5. Methods for Using Acoustic Confusability Measures

We now present two of the primary applications of an acoustic confusability measure.

The first of these, the "Confusatron," is a computer program that takes as input an arbitrary grammar G, with a finite language L(G), and finds phrases in L(G) that are likely to be frequent sources of error, for the speech recognition system. The second is a method, called maximum utility grammar augmentation, for deciding in a principled way whether or not to add a particular phrase to a grammar.

While our discussion presumes the existence of a raw pronunciation confusability measure $r(q(v)|q(w))$, and/or grammar-relative pronunciation confusion probabilities $p(q(v)|q(w), G)$, the methods presented in this section are independent of the particular measures and probabilities developed in this patent, and stand as independent inventions.

The Confusatron

We now explain a computer program, which we refer to as the "Confusatron," which automatically analyzes a given grammar G to find so-called "dangerous words." These are actually elements of L(G) with pronunciations that are easily confusable, by a given automatic speech recognition technology.

The value of the Confusatron is in its ability to guide a speech recognition system designer to decide what phrases are recognized with high accuracy within a given application, and which are not. If a phrase identified as likely to be poorly recognized may be discarded and replaced by another less confusable one, in the design phase, the system is less error-prone, and easier to use. If a phrase is likely to be troublesome, but must nevertheless be included in the system, the designer is at least forewarned, and may attempt to take some mitigating action.

We begin with a description of the Confusatron's function, and its basic mode of operation. We then describe variations; all are claimed as part of the patent.

The Confusatron generates a printed report, comprising two parts.

The first part, an example of which is exhibited in FIG. 8, lists exact homonyms. These are distinct entries v, w in L(G), with v≠w, for which q(v)=q(w), for some q(v)∈Q(v) and q(w)∈Q(w). That is, these are distinct literals with identical pronunciations. Thus no speech recognizer, no matter what its performance, is able to distinguish between v and w, when the utterance presented for recognition contains no additional context, and the utterance presented for recognition matches the given pronunciation. We say that the literals v and w "collide" on the pronunciation q(v)=q(w). Generating this homonym list does not require an acoustic confusability measure, just a complete catalog of the pronunciation set, Q(L(G)).

However, it is the second part that is really useful. Here the Confusatron automatically identifies words with distinct pronunciations that are nevertheless likely to be confused. This is the "dangerous word" list, an example of which is exhibited in FIG. 9.

The Confusatron operates as follows. Let G be a grammar, with finite language L(G), and finite pronunciation set Q(L(G)). Let {p(q(v)|q(w), G)} be a family of grammar-relative pronunciation confusability models, either derived from an underlying raw pronunciation confusion measure r(q(v)|q(w)) as described above, or defined by independent means.

It is useful at this point to introduce the quantity C(q(w), G), called the "clarity" of q(w) in G. This is a statistic of our invention, which is defined by the formula $$C(q(w), G) = 10 \log_{10}\left(\frac{p(q(w) \mid q(w), G)}{1 - p(q(w) \mid q(w), G)}\right).$$

The unit of this statistic, defined as above, is called a "deciclar," where "clar" is pronounced to rhyme with "car." This turns out to be a convenient expression, and unit, in which to measure the predicted recognizability of a given pronunciation q(w), within a given grammar G. Note that the clarity is defined with reference to a particular grammar. If the grammar is clear from context, we do not mention it or denote it in symbols.

Note that the higher the value of p(q(w)|q(w), G), which is the estimated probability that q(w) is recognized as itself, when enunciated by a competent speaker, the larger the value of C(q(w), G). Thus high clarity pronunciations are likely to be correctly decoded, whereas lower clarity pronunciations are less likely to be correctly decoded. This forms the basic operating principle of the Confusatron, which we now state in detail.

1. By plotting a histogram of clarity scores of correctly recognized and incorrectly recognized pronunciations, determine a clarity threshold Γ. Words with pronunciations with clarity below Γ are flagged as dangerous. Note: this step presumably need be performed only once, for a given speech recognition technology and acoustic confusability measure.
2. Let a grammar G be given. From G, by well-known techniques, enumerate its language L(G). From L(G), by use of the functionality of the automatic speech recognition system, or by other well-known means such as dictionary lookup, enumerate the pronunciation set Q(L(G)).
3. For each w in L(G):
   a. Compute the clarity C(q(w), G) of each q(w) in Q(w). (For this computation, presumably any and all of the previously described speedup techniques may be applied to reduce the execution time of this step.)
   b. Set the clarity of w, written C(w, G) to the minimum of C(q(w), G), over all q(w) in Q(w). If C(w, G)<Γ, declare w to be dangerous, and emit w and its clarity.
   c. In conjunction with the clarity computations of step 3a, identify and record the phrases v for which p(v|q(w), G) attains its highest values. Emit those phrases.
   d. In conjunction with the clarity computations of step 3a, identify and record any exact homonyms of q(w), and emit them separately.

Several important variations of the basic Confusatron algorithm are now noted.

Results for Pronunciations

First, rather than aggregating and presenting clarity results C(q(w), G) over all q(w) in Q(w), it is sometimes preferable to report them for individual pronunciations q(w). This can be useful if it is desirable to identify particular troublesome pronunciations.

Semantic Fusion

Second, there is often some semantic label attached to distinct phrases v and w in a grammar, such that they are known to have the same meaning. If they also have similar pronunciations (say, they differ by the presence of some small word, such as "a"), it is possible that the value of p(q(v)|q(w), G) is high. This may nominally cause q(w) to have low clarity, and thereby lead to flagging w as dangerous, when in fact the pronunciations q(v) that are confusable with q(w) have same underlying meaning to the speech recognition application.

It is straightforward to analyze the grammar's semantic labels, when they are present, and accumulate the probability mass of each p(q(v)|q(w), G) into p(q(w)|q(w), G), in those cases when v and w have the same meaning. This process is known as "semantic fusion," and it is a valuable improvement on the basic Confusatron, which is also claimed in this patent.

Dangerous Word Detection Only

Suppose our task is only to decide if a given pronunciation q(w) is dangerous or not, that is if C(q(w), G)<Γ. By straightforward algebra, this can be turned into an equivalent comparison p(q(w)|q(w), G)<$10^{(\Gamma/10)}/(1+10^{(\Gamma/10)})$. Let us write Ψ for this transformed threshold $10^{(\Gamma/10)}/(1+10^{(\Gamma/10)})$.

Recall that p(q(w)|q(w), G)=r(q(w)|q(w))/Z(q(w), G), and that the denominator is a monotonically growing quantity, as the defining sum proceeds over all q(v) in Q(L(G)), excluding homonyms of q(w). Now by definition $p(q(w)|q(w), G) < \Psi$ iff $r(q(w)|q(w))/Z(q(w), G) < \Psi$, that is iff $Z(q(w), G) > r(q(w)|q(w))/\Psi$.

Thus, we can proceed by first computing $r(q(w)|q(w))$, then accumulating $Z(q(w), G)$, which is defined as $Z(q(w), G) = \Sigma r(q(x)|q(w))$, where the sum runs over all non-homonyms of q(w) in Q(L(G)), and stopping as soon as the sum exceeds $r(q(w)|q(w))/\Psi$. If we arrange to accumulate into the sum the quantities $r(q(x)|q(w))$ that we expect to be large, say by concentrating on pronunciations of length close to that of q(w), then for dangerous words we may hope to terminate the accumulation of Z(q(w), G) without proceeding all the way through Q(L(G)).

Maximum Utility Grammar Augmentation

Suppose we are given a predetermined utility U(w) for recognizing a phrase w in a speech recognition application, a prior probability p(w) of the phrase. Then we may define the value of the phrase, within a grammar G, as $V(w, G) = p(w) p(w|w, G) U(w)$. We may then further define the value of a grammar as the value of all its recognizable phrases; that is, $V(G) = \Sigma V(w, G)$, where the sum extends over all w in L(G).

Consider now some phrase w that is not in L(G); we are trying to decide whether to add it to G or not. On the one hand, presumably adding the phrase has some value, in terms of enabling new functionality for a given speech recognition application, such as permitting the search, by voice, for a given artist or title in a content catalog.

On the other hand, adding the phrase might also have some negative impact, if it has pronunciations that are close to those of phrases already in the grammar: adding the new phrase could induce misrecognition of the acoustically close, already-present phrases.

Let us write G+w for the grammar G with w added to it. Then a principled way to decide whether or not to add a given phrase w is to compute the gain in value $\Delta V(w)$, defined as $\Delta V(w) = V(G+w) - V(G)$.

Moreover, given a list of phrases $w_1, w_2, \ldots$, under consideration for addition to G, this method can be used to rank their importance, by considering each $\Delta V(w_i)$, and adding the phrases in a greedy manner. By recomputing the value gains at each stage, and stopping when the value gain is no longer positive, a designer can be assured of not inducing any loss in value, by adding too many new phrases.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. In a computer implemented method for determining an empirically derived acoustic confusability measure, an iterative method for development of a probability model family $\Pi = \{p(d|t)\}$, comprising:
   providing a recognized corpus;
   establishing a termination condition which depends on any of:
      a number of iterations executed; and
      closeness of match between a previous and current probability family models;
   defining a family of decoding costs;
   setting an iteration count to 0;
   setting a phoneme pair count to 0;
   for each entry in the recognized corpus, performing the following steps:
      constructing a lattice;
      populating lattice arcs with values drawn from a current family of decoding costs;
      applying a Bellman-Ford dynamic programming algorithm, or a Dijkstra's shortest path algorithm, to find a shortest path through said lattice, from a source node to a terminal node; and
      traversing said determined shortest path, wherein for each arc that is traversed, the phoneme pair count is incremented by 1;
   for each transcription, computing a confidence score which is the sum of a phoneme pair value over all transcriptions paired with an utterance;
   estimating said probability model family;
   if the iteration count exceeds 0, testing said termination condition;
   if said termination condition is satisfied, returning a desired probability model family and stopping;
   if said termination condition is not satisfied, defining a new family of decoding costs and therefrom a new probability model family; and
   incrementing said iteration count and repeating.

2. The method of claim 1, said step of estimating said probability model family comprising either of:
   if the confidence value is non-zero for every transcription, then setting the probability to a ratio of confidence for a phoneme pair over confidence for said utterance; and
   if the confidence value is zero for any transcription, then applying a desired zero-count probability estimator to estimate probability.

3. The method of claim 1, the steps of
   constructing said lattice, populating said lattice arcs with values drawn from a current family of decoding costs,
   applying said Bellman-Ford dynamic programming algorithm, or said Dijkstra's shortest path algorithm, to find said shortest path through said lattice, and
   traversing said determined shortest path, wherein for each arc that is traversed, the phoneme pair count is incremented by 1, comprising:
   for an entry in the recognized corpus with a decoded phoneme sequence containing N phonemes, and a true phoneme sequence containing Q phonemes, constructing a rectangular lattice of dimension (N+1) rows by (Q+1) columns, and with an arc from a node (i, j) to each of nodes (i+1, j), (i, j+1), and (i+1, j+1), when present in said lattice, where "node (i, j)" refers to the node in row i, column j of the lattice;
   labeling:
      each arc from node (i, j) to node (i, j+1) with the cost $\delta_{(m)}(\epsilon|t_j)$
      each arc from node (i, j) to node (i+1, j) with the cost $\delta_{(m)}(d_i|\epsilon)$
      each arc from node (i, j) to node (i+1, j+1) with the cost $\delta_{(m)}(d_i|t_j)$,
   where $\delta_{(m)}$ is the associated decoding cost at the mth iteration of the algorithm, and
   applying the Bellman-Ford dynamic programming algorithm or Dijkstra's shortest path algorithm to find a shortest path from the source node, which is defined as node (0, 0), to the terminal node, which is defined as node (N, Q);
   outputting a sequence of arcs $A = a_1, a_2, \ldots, a_K$, in said lattice corresponding to the aforesaid minimum cost path from the source node to the terminal node; and for each arc $a_i$ in the minimum cost path A, labeled with a phoneme pair, incrementing the associated phoneme pair count by 1.

4. The method of claim 1, further comprising computing an empirically derived acoustic confusability of two phrases by:
determining said desired probability model family $\Pi=\{p(d|t)\}$;
using $\Pi$ to compute acoustic confusability of two arbitrary phrases w and v by:
computing a raw phrase acoustic confusability measure, which is a measure of the acoustic similarity of phrases v and w; and
computing a grammar-relative confusion probability measure, which is an estimate of the probability that a grammar-constrained recognizer returns the phrase v as a decoding, when a true phrase is w.

5. The method of claim 4, said step of computing a phrase acoustic confusability measure further comprising:
given pronunciations q(w) and q(v), computing the raw pronunciation acoustic confusability by:
defining decoding costs for each phoneme;
constructing a lattice $L=q(v) \times q(w)$, and labeling it with said phoneme decoding costs, depending upon the phonemes of q(v) and q(w);
finding a minimum cost path $A=a_1, a_2, \ldots, a_K$, from a source node to a terminal node of L;
computing a cost of said minimum cost path A, as a sum of the decoding costs for each arc $a \in A$; and
computing a raw pronunciation acoustic confusability measure of q(v) and q(w).

6. The method of claim 4, further comprising:
computing a phrase acoustic confusability measure with no reference to pronunciations by any one of the following:
worst case;
most common;
average case;
random; and
a combination of the worst case, most common, average case, and random methods into additional hybrid variants.

7. The method of claim 4, said step of computing a grammar-relative pronunciation confusion probability comprising:
letting L(G) be a set of all phrases admissible by a grammar G, and letting Q(L(G)) be a set of all pronunciations of all such phrases;
letting two pronunciations q(v), q(w)∈Q(L(G)) be given;
estimating a probability that an utterance corresponding to a pronunciation q(w) is decoded by a recognizer $R_G$ as q(v), as follows:
computing a normalizer of q(w) relative to G, written Z(q(w), G), as $$Z(q(w),G)=\Sigma r(q(x)|q(w)),$$

where the sum extends over all q(x)∈Q(L(G)); and
setting a probability p(q(v)|q(w), G)=r(q(v)|q(w))/Z(q(w), G).

* * * * *